United States Patent
Bone et al.

(10) Patent No.: US 10,630,646 B2
(45) Date of Patent: Apr. 21, 2020

(54) METHODS AND SYSTEMS FOR COMMUNICATING WITH AN M2M DEVICE

(71) Applicant: VODAFONE IP LICENSING LIMITED, Newbury, Berkshire (GB)

(72) Inventors: Nick Bone, Newbury (GB); Friedhelm Rodermund, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/021,885

(22) PCT Filed: Sep. 12, 2014

(86) PCT No.: PCT/GB2014/052771
§ 371 (c)(1),
(2) Date: Mar. 14, 2016

(87) PCT Pub. No.: WO2015/036776
PCT Pub. Date: Mar. 19, 2015

(65) Prior Publication Data
US 2016/0226847 A1    Aug. 4, 2016

(30) Foreign Application Priority Data

Sep. 13, 2013 (GB) .................................. 1316370.4
Oct. 16, 2013 (GB) .................................. 1318339.7
(Continued)

(51) Int. Cl.
*H04L 29/06* (2006.01)
*H04W 4/70* (2018.01)
(Continued)

(52) U.S. Cl.
CPC ............ *H04L 63/04* (2013.01); *G06F 9/4401* (2013.01); *G06F 13/1689* (2013.01);
(Continued)

(58) Field of Classification Search
CPC ..... H04L 63/20; H04L 63/0428; H04L 63/08; G06F 13/1689; G06F 21/71; H04W 4/005; H04W 4/001; H04W 4/12
See application file for complete search history.

(56) References Cited

U.S. PATENT DOCUMENTS 7,069,452 B1   6/2006  Hind et al.
7,360,129 B2   4/2008  Tang
(Continued)

FOREIGN PATENT DOCUMENTS

DE     102010010760       9/2011
EP     2 536 173 A1      12/2012
(Continued)

OTHER PUBLICATIONS

Mike Meyerstein et al., Security Aspects of Smart Cards in Machine-to-Machine (M2M) Advanced mobile Network Applications (Jan. 2009).*
(Continued)

*Primary Examiner* — Sharon S Lynch
(74) *Attorney, Agent, or Firm* — Workman Nydegger

(57) ABSTRACT

Method, apparatus and system for communicating between a machine to machine, M2M, device 110 and a device management, DM, server 420 over SMS, comprising: obtaining key material, the key material configured to protect data communicated between the M2M device 110 and the DM server 420. Protecting data to be communicated using the key material. Communicating the protected data between the M2M device 110 and the DM server 420 over SMS.

17 Claims, 10 Drawing Sheets

(30) Foreign Application Priority Data

| May 30, 2014 | (GB) | 1409641.6 |
|---|---|---|
| May 30, 2014 | (GB) | 1409643.2 |
| May 30, 2014 | (GB) | 1409652.3 |
| May 30, 2014 | (GB) | 1409663.0 |
| Aug. 22, 2014 | (GB) | 1415003.1 |

(51) Int. Cl.

| H04W 4/50 | (2018.01) |
|---|---|
| H04W 4/14 | (2009.01) |
| H04W 12/02 | (2009.01) |
| H04W 88/02 | (2009.01) |
| H04W 88/06 | (2009.01) |
| H04L 29/08 | (2006.01) |
| H04W 28/08 | (2009.01) |
| H04W 80/06 | (2009.01) |
| H04W 12/04 | (2009.01) |
| H04W 12/00 | (2009.01) |
| G06F 21/60 | (2013.01) |
| H04B 1/3816 | (2015.01) |
| G06F 13/16 | (2006.01) |
| G06F 13/28 | (2006.01) |
| G06F 13/40 | (2006.01) |
| H04W 4/12 | (2009.01) |
| H04W 12/06 | (2009.01) |
| H04W 52/02 | (2009.01) |
| G06F 21/71 | (2013.01) |
| H04L 9/08 | (2006.01) |
| H04W 8/04 | (2009.01) |
| G06F 9/4401 | (2018.01) |

(52) U.S. Cl.
CPC .......... *G06F 13/28* (2013.01); *G06F 13/4027* (2013.01); *G06F 21/606* (2013.01); *G06F 21/71* (2013.01); *H04B 1/3816* (2013.01); *H04L 9/0861* (2013.01); *H04L 63/029* (2013.01); *H04L 63/0428* (2013.01); *H04L 63/0442* (2013.01); *H04L 63/061* (2013.01); *H04L 63/062* (2013.01); *H04L 63/08* (2013.01); *H04L 63/0823* (2013.01); *H04L 63/0869* (2013.01); *H04L 63/0876* (2013.01); *H04L 63/10* (2013.01); *H04L 63/166* (2013.01); *H04L 63/20* (2013.01); *H04L 67/1095* (2013.01); *H04L 67/125* (2013.01); *H04L 67/42* (2013.01); *H04W 4/12* (2013.01); *H04W 4/14* (2013.01); *H04W 4/50* (2018.02); *H04W 4/70* (2018.02); *H04W 8/04* (2013.01); *H04W 12/0027* (2019.01); *H04W 12/02* (2013.01); *H04W 12/04* (2013.01); *H04W 12/04031* (2019.01); *H04W 12/06* (2013.01); *H04W 28/08* (2013.01); *H04W 52/0229* (2013.01); *H04W 80/06* (2013.01); *H04W 88/02* (2013.01); *H04W 88/06* (2013.01); *H04L 63/0838* (2013.01); *H04L 2463/061* (2013.01); *Y02D 10/14* (2018.01); *Y02D 10/151* (2018.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/168* (2018.01); *Y02D 70/21* (2018.01); *Y02D 70/22* (2018.01)

(56) References Cited

U.S. PATENT DOCUMENTS

| 8,934,453 | B1 | 1/2015 | Sarnaik et al. | |
| 9,077,547 | B2* | 7/2015 | Allen | H04L 67/146 |
| 9,088,423 | B2* | 7/2015 | Allen | H04L 12/1403 |
| 9,603,189 | B2* | 3/2017 | Holtmanns | H04W 8/205 |
| 9,800,621 | B2* | 10/2017 | Starsinic | H04L 65/1069 |
| 9,806,964 | B2* | 10/2017 | Allen | G06Q 30/0226 |
| 2003/0033591 | A1 | 2/2003 | Fournier | |
| 2003/0051140 | A1 | 3/2003 | Buddhikot | |
| 2003/0123669 | A1* | 7/2003 | Koukoulidis | G06Q 20/04 380/281 |
| 2003/0229686 | A1 | 12/2003 | Kortright | |
| 2003/0229786 | A1* | 12/2003 | Hollis | H04L 63/0442 713/168 |
| 2004/0030601 | A1* | 2/2004 | Pond | B67D 7/145 705/16 |
| 2005/0120106 | A1 | 6/2005 | Alertao | |
| 2006/0182280 | A1 | 8/2006 | Laitinen et al. | |
| 2006/0196931 | A1 | 9/2006 | Holtmanns et al. | |
| 2006/0251257 | A1 | 11/2006 | Haverinen | |
| 2007/0118560 | A1 | 5/2007 | Bornhoevd | |
| 2007/0169107 | A1* | 7/2007 | Huttunen | H04L 29/06 717/174 |
| 2007/0234041 | A1* | 10/2007 | Lakshmeshwar | H04L 9/3271 713/156 |
| 2007/0240205 | A1 | 10/2007 | Holtmanns et al. | |
| 2007/0248232 | A1 | 10/2007 | Driscoll et al. | |
| 2008/0153521 | A1* | 6/2008 | Benaouda | G01D 4/004 455/466 |
| 2009/0138955 | A1 | 5/2009 | Vinayakray-Jani | |
| 2010/0302009 | A1* | 12/2010 | Hoeksel | G01D 21/00 340/10.1 |
| 2010/0304716 | A1* | 12/2010 | Hoeksel | H04W 60/00 455/411 |
| 2011/0010543 | A1* | 1/2011 | Schmidt | H04W 12/10 713/168 |
| 2011/0126017 | A1 | 5/2011 | Blom et al. | |
| 2011/0132987 | A1* | 6/2011 | Hoeksel | H04L 63/0853 235/492 |
| 2011/0137916 | A1 | 6/2011 | Deen et al. | |
| 2011/0173450 | A1* | 7/2011 | Knobbe | H04L 63/061 713/171 |
| 2011/0265158 | A1* | 10/2011 | Cha | H04L 63/0823 726/6 |
| 2011/0289315 | A1 | 11/2011 | Laitinen et al. | |
| 2011/0320802 | A1 | 12/2011 | Wang | |
| 2012/0041867 | A1* | 2/2012 | Glodjo | G06Q 20/10 705/37 |
| 2012/0072979 | A1* | 3/2012 | Cha | G06F 21/34 726/7 |
| 2012/0190354 | A1* | 7/2012 | Merrien | H04W 4/70 455/422.1 |
| 2012/0311335 | A1* | 12/2012 | Fransen | H04L 63/06 713/170 |
| 2012/0322457 | A1* | 12/2012 | Lee | H04W 4/70 455/452.1 |
| 2012/0331298 | A1* | 12/2012 | Xu | H04L 63/08 713/171 |
| 2013/0012159 | A1* | 1/2013 | Lodeweyckx | H04W 8/183 455/406 |
| 2013/0012168 | A1* | 1/2013 | Rajadurai | H04L 9/0822 455/411 |
| 2013/0016657 | A1* | 1/2013 | Muhanna | H04W 4/005 370/328 |
| 2013/0039493 | A1* | 2/2013 | Bauernfeind | H04L 9/14 380/270 |
| 2013/0212236 | A1* | 8/2013 | Foti | G06F 15/177 709/221 |
| 2013/0217361 | A1* | 8/2013 | Mohammed | H04W 12/06 455/411 |
| 2013/0231087 | A1* | 9/2013 | O'Leary | H04W 8/22 455/411 |
| 2013/0275758 | A1* | 10/2013 | Marlow | H04L 9/0861 713/171 |

(56) References Cited

U.S. PATENT DOCUMENTS

| | | | |
|---|---|---|---|
| 2013/0329653 A1* | 12/2013 | Russell, Jr. | H04W 8/20 370/329 |
| 2014/0011478 A1* | 1/2014 | Collins | H04L 43/00 455/411 |
| 2014/0040988 A1* | 2/2014 | Nozulak | H04W 4/001 726/3 |
| 2014/0122878 A1* | 5/2014 | Cho | H04L 9/006 713/168 |
| 2014/0146826 A1* | 5/2014 | Herriot | H04W 4/005 370/401 |
| 2014/0179263 A1* | 6/2014 | Collins | H04L 43/00 455/405 |
| 2014/0179360 A1* | 6/2014 | Jackson | H04W 4/14 455/466 |
| 2014/0189075 A1* | 7/2014 | Stansell | H04W 4/003 709/220 |
| 2014/0198910 A1* | 7/2014 | Allen | H04L 63/10 379/265.09 |
| 2014/0233735 A1* | 8/2014 | Zhang | H04L 9/0656 380/270 |
| 2014/0235285 A1* | 8/2014 | Stojanovski | H04W 4/14 455/466 |
| 2014/0315514 A1* | 10/2014 | Collins | H04L 43/00 455/405 |
| 2014/0330952 A1* | 11/2014 | Starsinic | H04W 4/001 709/223 |
| 2015/0023219 A1* | 1/2015 | Jin | H04L 12/1403 370/259 |
| 2015/0054652 A1* | 2/2015 | Crochet | G08B 5/36 340/815.4 |
| 2015/0133077 A1* | 5/2015 | Collins | H04L 43/00 455/405 |
| 2015/0215163 A1* | 7/2015 | Kowalski | H04L 41/0803 714/4.1 |
| 2015/0244676 A1* | 8/2015 | Collins | H04L 43/00 726/12 |
| 2015/0296379 A1* | 10/2015 | Nix | H04L 9/0869 713/171 |
| 2015/0319156 A1* | 11/2015 | Guccione | H04L 63/08 726/7 |
| 2015/0332399 A1* | 11/2015 | Glodjo | G06Q 20/10 705/37 |
| 2015/0358824 A1* | 12/2015 | Kim | H04W 12/0802 726/4 |
| 2016/0036779 A1* | 2/2016 | Collins | H04L 43/00 726/12 |
| 2016/0226828 A1* | 8/2016 | Bone | H04W 4/70 |
| 2016/0232116 A1 | 8/2016 | Bone et al. | |
| 2016/0234181 A1 | 8/2016 | Bone et al. | |
| 2016/0234182 A1 | 8/2016 | Bone et al. | |
| 2016/0234255 A1 | 8/2016 | Bone et al. | |
| 2016/0234683 A1 | 8/2016 | Bone et al. | |
| 2018/0034713 A1* | 2/2018 | Allen | G06Q 30/00 |

FOREIGN PATENT DOCUMENTS

| | | |
|---|---|---|
| EP | 2654332 A1 | 10/2013 |
| EP | 2713642 A1 | 4/2014 |
| KR | 20130127826 | 11/2013 |
| WO | 2004114144 | 12/2004 |
| WO | 2007042345 | 4/2007 |
| WO | 2009004590 | 1/2009 |
| WO | 2010102259 | 9/2010 |
| WO | 2011085810 | 7/2011 |
| WO | 2011131220 | 10/2011 |
| WO | 2012062077 A1 | 5/2012 |
| WO | 2012094879 | 7/2012 |
| WO | WO2012131659 A1 | 10/2012 |
| WO | 2012151819 | 11/2012 |
| WO | WO 2013/060302 A1 | 5/2013 |
| WO | 2013113162 A1 | 8/2013 |
| WO | 2013120225 A1 | 8/2013 |
| WO | 2014041806 A1 | 3/2014 |
| WO | 2014165747 | 10/2014 |

OTHER PUBLICATIONS

Inhyok Cha, Trust in M2M Communication, in IEEE Vehicular Technology Magazine (Sep. 2009).*

International Search Report for PCT/GB2014/052766 dated Jan. 23, 2015.

Ericsson: "GBA for constrained devices", 3GPP Draft; S3-131056 PCR33868 GBACONSTR FIN, 3rd Generation Partnership Project (3GPP), Mobile Competence Centre ; 650, Route Des Lucioles ; F-06921 Sophia-Antipolis Cedex ; France vol. SA WG3, No. San Francisco, US; Nov. 11, 2013-Nov. 15, 2013 Nov. 4, 2013 (Nov. 4, 2013), XP050765950, Retrieved from the Internet: URL:http://www.3gpp.org/ftp/tsg_sa/WG3_Security/TSGS3 73 San Francisco/Docs/ [retrieved Fin Nov. 4, 2013].

International Search Report for PCT/GB2014/052768 dated Apr. 22, 2015.

Exalted: "WP5—Security, Authentication & Provisioning. Deliverable 5.1 Security and Provisioning Solutions", Feb. 29, 2012 (Feb. 29, 2012), XP055161176, Retrieved from the Internet: URL:http://cordis.europa.eu/docs/projects/ cnect/2/258512/080/deliverables/001-EXALTEDWP5D51.pdf [retrieved on Jan. 12, 2015] Chapter 5.

"3rd Generation Partnership Project; Technical Specification Group Services and System Aspects; Security aspects of Machine-Type Communications; (Release 11)", 3GPP Draft; S3-120774-TR33868-RM, 3rd Generation Partnership Project (3GPP), Mobile Competence Centre ; 650, Route Des Lucioles; F-06921 Sophia-Antipolis Cedex ; France Jul. 13, 2012 (Jul. 13, 2012), XP050685307, Retrieved from the Internet: URL:http://www.3gpp.org/ftp/tsg_sa/WG3_Sec urity/TSG83_68_Bratislava/Docs/ [retrieved on Jul. 13, 2012] Section 7.2 and subsections.

N. Asokan et al: "Applicability of identity-based cryptography for disruption-tolerant networking", Proceedings of the 1st International Mobisys Workshop on Mobile Opportunistic Networking, MOBIOPP '07, Jan. 1, 2007 (Jan. 1, 2007), p. 52, XP055181615, New York, New York, USA DOI: 10.1145/1247694.1247705 ISBN: 978-1-59593688-2 Abstract Section 3 and subsections Figure 2.

"3rd Generation Partnership Project; Technical Specification Group Services and System Aspects; IP Multimedia Subsystem (IMS) media plane security (Release 10)", 3GPP Draft; 33828-A00, 3rd Generation Partnership Project (3GPP), Mobile Competence Centre ; 650, Route Des Lucioles ; F-06921 Sophia-Antipolis Cedex ; France Jun. 29, 2012 (Jun. 29, 2012), XP050905073, Retrieved from the Internet: URL:http://www.3gpp.org/ftp/Specs/ 2014-12/Rel-10/33 series/[retrieved on Jun. 29, 2012] Section 7.6 and subsections.

"OneM2M-TR-0002-Architecture Analysis Part 1-V-0.2.0 Architecture Analysis—Part 1: Analysis of architectures proposed for consideration by oneM2M", Jul. 28, 2013 (Jul. 28, 2013), XP055154643, Retrieved from the Internet: URL:http://www.onem2m.org/images/files/deliverables/oneM2M-TR-0002-Architecture_Analysis Part 1-VO 2 0.doc [retrieve1 on Nov. 24, 2014] Section 6, Section 8.

Gemalto: "Corrections and Clarifications in Security text; M2M(12)19 121 CR TS 102 690 R2 Removal of Kma AligtimenT oT CTausi 5 17iith", ETSI Draft; M2M(12)19 121 CR TS 102 690 R2 Removal of KMA Alignment of Clause 5 With_, European Telezommunicattoo Standards Institute (ETSI), 650, Route Des Lucioles ; F-06921 Sophia-Antipolis; France, vol. SmartM2M, Mar. 22, 2012 (Mar. 22, 2012), pp. 1-32, XP014214112, [retrieved on Mar. 22, 2012] Sections 8.4.4 and 8.5.

"Lightweight Machine to Machine Technical Specification; OMA-TS-Lightweight M2M-V1 0-20130912-D RM", OMA-TS-LIGHTWEIGHTM2M-V10-20130912-DRM, Open Mobile Alliance(0MT), 4330 La Jolla Village Dr., Suite 110 San Diego, CA 92122; USA, No. 1.0 Sep. 12, 2013 (Sep. 12, 2013), pp. 1-101, XP064164725, Retrieved from the Internet:URL:ftp/Public documents/

(56) References Cited

OTHER PUBLICATIONS

DM/LightweightM2M /Permanent documents/ [retrieved on Sep. 12, 2013]. Section 5.3 and subsections, Section 5.4 and subsections, Section 7 and subsections.
International Search report for PCT/GB2014/052772 dated Mar. 2, 2015.
3GPP: "3rd Generation Partnership Project; Technical Specification Group Services and System Aspects; Generic Authentication Architecture (GAA);Generic Bootstrapping Architecture (GBA) Push Function (Release 8)", 3GPP Draft; S3-080605 33223-800, 3rd Generation Partnership Project (3GPP), Mobile Competence Centre ; 650, Route Des Lucioles; F-06921 Sophia-Antipolis Cedex; France, vol. SA WG3, No. Sophia; Jun. 11, 2008, Jun. 11, 2008 (Jun. 11, 2008), XP050280786, [retrieved on Jun. 11, 2008] Section 4.
International Search Report for PCT/GB2014/052767 dated Jan. 23, 2015.
Nhon Chu et al: "OMA DM vl.x compliant Lightweight Device Management for Constrained M2M devices", European Transactions on Telecommunications, Aug. 5, 2013 (Aug. 5, 2013), pp. 517-531, XP055155504, DOI: 10.1002/ett Retrieved from the Internet: URL:http://www.leftfoot.rs/nenad_gligoric/ publications/omadm. pdf [retrieved on Nov. 27, 2014] Anstract Section 3 Section 6.
GB Search Report for GB1414997.5 dated Jan. 16, 2015.
GB Search Report for GB1415931.3 dated Mar. 18, 2015.
International Search Report for PCT/GB2014/052786 dated Jan. 23, 2015.
Fujitsu et al: OMA-DM M2M Considerations OMA-DM-2011-0070R02-INP M2M Considerations OMA-DM-2011-0070R02-INP M2M Iomat, 4330 La Jolla Village Dr., Suite 110 San Diego, CA 92122 ; USA May 2, 2011 (May 2, 2011), pp. 1-23, XP064066725, Retrieved from the Internet: URL:ftp/Public documents/DM/2011/ [retrieved on May 24, 2011] the whole document.
"M2M(11)0278r3 Discussion Materialfor Joint Conference all with OMA DM; M2M(11)0278r3 Discussion Material_ for Joint Conference Call with OMA DM", M21(11)02780 Discussion Material for Joint Conference Call With OMA DM, Open Mobile Alliance (OMA), 4330 La Jolla Village Dr., Suite 110 San Diego, CA 92122; USA Apr. 26, 2011 (Apr. 26, 2011), pp. 1-14, XP064066718, Retrieved from the Internet: URL:ftp/Public documents/DM/2011/ [retrieved on Apr. 26, 2011] the whole document.
GB Search Report for GB1414999.1 dated Jan. 13, 2015.
International Search Report for PCT/GB2014/052773 dated Jan. 23, 2015.
Generic Authentication Architecture (GAA), 3GPP TR 33.919, 3rd Generation Partnership Project (3GPP), V11.0.0, Sep. 2012. See section 7.3.2 especially.
Sachin Agarwal et al:"Operator-based over-the-air M2M wireless sensor network security", Intelligence in Next Generation Networks (ICIN), 2010 14th International Conference on, IEEE, Piscataway, NJ, USA, Oct. 11, 2010 (Oct. 11, 2010), pp. 1-5, XP031805025, ISBN: 978-1-4244-7443-1 Abstract Sections I and IV.
"Lightweight Machine to Machine Technical Specification; OMA-TS-LightweightM2M-V1 0-20131210-C", OMA-TS-LIGHTWEIGHTM2M-V1 0-20131210-C, Open Mobile Alliance (OMA), 4330 La Jolla Village Dr., Suite 110 San Diego, CA 92122 ; USAno. 1.0 Dec. 10, 2013 (Dec. 10, 2013), pp. 1-104, XP064175911, Retrieved from the Internet: URL:ftp/Publicdocuments/DM/LightweightM2M /Permanent documents/[retrieved on Dec. 17, 2013] Section 5 and subsections.
Alcatel-Lucent "Presentation of WID Information: Management Interface for M2M 1.0" Sep. 10, 2013, pp. 1-15.
U.S. Appl. No. 15/021,876, filed Mar. 31, 2017, Office Action.
International Search Report for PCT/GB2014/052771 dated Jan. 23, 2015.
IPO Search Report for GB1415003.1 dated Dec. 10, 2014.
"Large Scale Integrating Project Exalted Expanding LTE for Devices WP4—End-to-End (E2E) M21 System", FP7 Contract No. 258512, Oct. 31, 2012 (Oct. 31, 2012), XP055154391, Retrieved from the Internet: URL:http://www.ict-exalted.eu/fileadmin/documents/ EXALTED_WP4D4.3.pdf [retrieved on Nov. 21, 2014] Section 4.2.2.2 and subsections.
Musa Unmehopa: "Management and Provisioning of M2M Devices for a Connected World", ETSI M2M Workshop, Oct. 26, 2011 (Oct. 26, 2011), XP055160332, Retrieved from the Internet: URL:http:// docbox.etsi.org/Workshop/2011/201110_M2MWORKSHOP/03_ M2MCOOPERATION/OMAUN_MHOPA.pdf [retrieved on Jan. 7, 2015] Slides 8 and 10.
Nenad Gligoric et al: "Application-layer security mechanism for M2M communication over SMS", Telecommunications Forum (TELFOR), 2012 20th, IEEE, Nov. 20, 2012 (Nov. 20, 2012), pp. 5-8, XP032313672, DOI: 10.1109/TELFOR.2012.6419578 ISBN: 978-1-46732983-5 Abstract sections I and III.
The Constrained Application Protocol for Pervasive M2M Communications, Percom Workshops, 2012 IEEE, Mar. 19-23, 2012, Lugano. pp. 483-485. E-ISBN:978-1-4673-0906-6.
Search Report issued in GB Application No. 1409652.3 dated Oct. 8, 2014.
Search Report issued in GB Application No. 1409641.6 dated Nov. 7, 2014.
Search Report issued in GB Application No. 1409643.2 dated Oct. 14, 2014.
Further Search Report issued in GB Application No. 1409663.0 dated May 29, 2015.
Further Search Report issued in GB Application No. 1409663.0 dated May 28, 2015.
Search Report issued in GB Application No. 1409663.0 dated Nov. 11, 2014.
3GPP TS 33.220 v12.1.0 "Technical Specification Group Services and System Aspects; Generic Authentication Architecture (GAA); Generic Bootstrapping Architecture (GBA) (Release 12)", Jun. 26, 2013.
3GPP TS 33.223 v11.0.0 "Technical Specification Group Services and System Aspects; Generic Authentication Architecture (GAA); Generic Bootstrapping Architecture (GBA) Push function (Release 11)" Sep. 19, 2012.
Phillips, "Weightless Security" Cambridge Wireless PDF Presentation Apr. 18, 2013, available at www.cambridgewireless.co.uk/ Presentation/CD180413_AmyasPhillips.pdf.
Lightweight Mutual Authentication for CoAP, Mar. 3, 2014, available at http://wiki.tools.ietf.org/html/draff-bhattacharyya-core-coap-lite-auth-00.
Shelby "OMA Lightweight M2M Tutorial", May 19, 2013, avialable at http://www.slideshare.net/zdshelby/oma-lightweightm2-mtutorial.
Menezes et al. "Handbook of Applied Cryptography" 1997, CRC Press, pp. 22-25 and 551-553.
Office Action issued in U.S. Appl. No. 15/021,888 dated Feb. 27, 2018.
Office Action issued in U.S. Appl. No. 15/021,879 dated Dec. 26, 2017.
Office Action issued in U.S. Appl. No. 15/021,873 dated May 18, 2018.
Office Action issued in U.S. Appl. No. 15/021,888 dated Oct. 2, 2018.
Office Action issued in U.S. Appl. No. 15/021,873 dated Oct. 4, 2018.
Office Action issued in U.S. Appl. No. 15/021,879 dated Jun. 26, 2018.
Office Action issued in U.S. Appl. No. 15/021,871 dated Jan. 2, 2019.

* cited by examiner

METHODS AND SYSTEMS FOR COMMUNICATING WITH AN M2M DEVICE

CROSS REFERENCE TO RELATED APPLICATIONS

This application is a U.S. Nationalization of PCT Application Number PCT/GB2014/052771, filed on Sep. 12, 2014, which claims priority to GB Patent Application No. 1409643.2, filed on May 30, 2014, which claims priority to GB Patent Application No. 1409641.6, filed on May 30, 2014, which claims priority to GB Patent Application No. 1409652.3, filed on May 30, 2013, which claims priority to GB Patent Application No. 1318339.7, filed on Oct. 16, 2013, which claims priority to GB Patent Application No. 1316370.4, filed on Sep. 13, 2013, the entireties of which are incorporated herein by reference.

FIELD OF THE INVENTION

The present invention relates to a method and system for communicating with a machine to machine (M2M) device and in particular, with communicating securely.

BACKGROUND OF THE INVENTION

Machine to Machine (M2M) devices are often numerous, hard-to-reach, and have constrained capabilities (owing to low cost, small size, low processing power or limited battery life). All of this makes their management, often remote, very complicated. Moreover, M2M devices often need to be managed in a secure manner. For example, they may contain information that is commercially sensitive and/or confidential for the one or more entities that manage and/or own said devices. There is a need to remotely manage them in a secure way, while respecting these constraints.

The Lightweight M2M protocol describes communicating with M2M devices over SMS. Whilst communicating over SMS can be more efficient and is a convenient channel for such devices, there is limited or no security for such SMS communications.

Therefore, there is required a system and method that allows the M2M devices to communicate more securely. Details of 3GPP Standards and Technologies Used to Implement Aspects of the Method and System One of these architectures of 3GPP is a Generic Authentication Architecture (GAA), which is a complex of standards which is described, for example, in 3GPP TS 33.919 (entitled "3G Security; Generic Authentication Architecture (GAA); System description", currently it may be retrieved at http://www.3gpp.org/ftp/Specs/html-info/33919.htm).

Generic Bootstrapping Architecture (GBA) is a 3GPP standard defined in 3GPP TS 33.220 (entitled "Generic Authentication Architecture (GAA); Generic Bootstrapping Architecture (GBA)", it could be currently retrieved at http://www.3gpp.org/ftp/specs/html-info/33220.htm). GBA is part of the complex of standards called GAA (see above).

GBA is a standard which enables a shared secret to be derived (bootstrapped) from the existing security association between a mobile network and a SIM card. This involves a network element called a Bootstrapping Server Function (BSF). In other words, GBA leverages the security of a SIM card (UICC) to authenticate mobile equipment, and then derive key material for general-purpose applications.

GBA may be advantageously used to provide high-security to the communication between a client and the server, thus allowing remotely managing, controlling and, in general, communicating with a device in a high security manner. In particular, GBA (or a GBA-like architecture) is used for enabling a secure communication with the device (which, according to an aspect of the present disclosure, may be an M2M device), said communication being between a server and a client, the client being associated with the device, and wherein this communication is done for managing the device and/or services provided by (or via) the device, thus enabling a secure management of that device and/or the services provided by (or via) the device. In this way, the device and/or the services provided by (or via) the device can be safely, securely and efficiently managed in a remote manner via a remote server.

GBA has been developed mainly for securing mobile broadcast (e.g. pay TV and equivalents). Indeed, standards for Multimedia Broadcast Multicast Service (MBMS) rely on GBA. Similarly, Open Mobile Alliance (OMA) Mobile Broadcast Services Enabler Suite (BCAST) smartcard profile relies on GBA. To date, most of the limited number of deployments of GBA in the world has been for mobile broadcast. GBA has also been standardised as an optional feature in conjunction with presence services, and within miscellaneous "federated identity" services (e.g. Liberty Alliance, OpenID). In general, it is understood that GBA has been designed for use with mobile devices, such as mobile phones, laptop, computers, and many of the designed features have been provisioned with this in mind.

A variant of GBA, called "GBA Push", has been proposed for securing a message between a client and a DM server in the context of OMA Device Management Security. The OMA Device Management is specifically designed for management of mobile devices such as mobile phones, tablet, computers, etc.

A different recent standard document (TS 102 690) merely mentions, in the context of M2M communications, the use of a standard GBA to secure communications between a device/gateway service layer and a network service layer.

There are some alternatives for identifying/authenticating a mobile user/device to a service. All of these alternatives are simpler than using GBA. For example, mobile operators and service providers can use WAP header enrichment.

Alternatively, the service provider can request the user to enter their phone number, send an SMS one-time password to that phone number, and ask the user to read the SMS and enter the password. These alternatives all work well with mobile devices and operators already, so service providers use them, although they are not as secure as GBA.

Additionally, many service providers prefer to offer services to a huge range of mobile devices, many of which do not contain a SIM card (e.g. PCs, laptops, Wi-fi-only tablets etc.). Since GBA relies on a SIM card/UICC in order to work, there has been no interest in using it.

Strong security is not possible with current alternatives such as a user-entered PIN or a bootstrapping message delivered by an SMS. These alternatives would either not be feasible or they would not provide the required level of security. First, there might not be a user around to enter a PIN (as most M2M devices operate independently from human intervention). Second, the service provider may be likely to want strong security (e.g. because M2M devices may include critical infrastructure), whereas PIN-based bootstrapping has weaker security. Third, if a PIN or SMS-based bootstrapping goes wrong (server connects to wrong client, client connects to wrong server, or there is a Man-In-The-Middle), then the user is likely to notice, complain and get it fixed, whereas an M2M device is unlikely to notice and complain, so may be permanently compromised. Neither is particularly practical by way of existing methods. For example, the OMA Device Management uses GBA Push for securing a message between a client and a DM server, and there is no explanation of how a similar architecture could be used or even modified for managing the device. Moreover, as mentioned above, the OMA Device Management is not compatible for use with an M2M device, as discussed above. This is particularly true for low cost, simple M2M devices, such as simple sensors, switches, low cost trackers etc. Further, the standard document mentioned above uses a standard GBA to secure communications between a device/gateway service layer and a network service layer. Thus, the communication is not used for device/service management-related communications, and it is not clear, based on the observations made above, how a similar architecture could be used or even modified for managing the device from the server. Moreover, for the reasons mentioned above, the OMA Device Management and the standard document are incompatible, and a combination of the GBA Push for OMA Device Management with the standard document is not feasible, as it would result in the wrong device management protocol (i.e. one that is not suitable for M2M devices, particularly simple M2M devices), and some very laborious effort to make the two compatible and delete the elements which are redundant.

The OMA has defined a lightweight protocol for managing (as well as interacting with) M2M devices and managing services provided by M2M devices (e.g. remote control of attached sensors or machines). This protocol is called LWM2M, which is described in detail at http://technical.openmobilealliance.org/Technical/release_program/lightweightM2M_v1_0.aspx This protocol runs over the CoAP protocol (analogous to http)—more specifically CoAP over DTLS (coaps) which is analogous to http over TLS (https). However, coaps requires a secure association to be provisioned between a device and a network server (DM Server) while providing no strong means to provision such an association from scratch.

A security aspect of OMA LWM2M is defined in Lightweight Machine to Machine Technical Specification Candidate Version 1.0—10 Dec. 2013 (OMA-TS-LightweightM2M-V1_0-20131210-C).

In addition, there exists two protocols, the first one called DTLS defined in RFC 6347 (entitled "Datagram Transport Layer Security Version 1.2"; it could be currently retrieved at http://tools.ietf.org/html/rfc6347); the second one called CoAP defined in draft-ietf-core-coap-18 (entitled "Constrained Application Protocol (CoAP)"; it could be currently retrieved at http://datatracker.ietf.org/doc/draft-ietf-core-coap/). Both protocols are currently used in LWM2M. CoAP is still only an IETF draft (not a full RFC), and DTLS version 1.2 is also comparatively new (January 2012): versions of TLS have often existed as RFCs for several years before receiving widespread adoption.

The User Datagram Protocol (UDP) channel security for [COAP] is defined by the Datagram Transport Layer Security (DTLS) [RFC6347], which is the equivalent of TLS v1.2 [RFC5246] for HTTP and utilizes a subset of the Cipher Suites defined in TLS. (Refers to TLS Cipher Suite registry http://www.iana.org/assignments/tls-parameters/tls-parameters.xml) The DTLS binding for CoAP is defined in Section 9 of [CoAP]. DTLS is a long-lived session based security solution for UDP. It provides a secure handshake with session key generation, mutual authentication, data integrity and confidentiality.

The keying material used to secure the exchange of information within a DTLS session may be obtained using one of the bootstrap modes defined in Section 5.1.2 Bootstrap Modes of OMA LWM2M. The formats of the keying material carried in the LWM2M Security Object Instances are defined in Appendix E.1.1.

There also exists an authentication protocol HTTP Digest authentication, which is defined in RFC 3310 (entitled "Hypertext Transfer protocol (HTTP) Digest Authentication using Authentication and Key Agreement (AKA)", it can currently be retrieved at http://www.ietf.org/rfc/rfc3310.txt).

The GAA cluster of specifications TS 33.222 (entitled "Generic Authentication Architecture (GAA); Access to network application functions using Hypertext Transfer Protocol over Transport Layer Security (HTTPS)") defines a general approach for pre-shared key TLS (TLS-PSK, RFC 4279). This can currently be retrieved at http://www.3gpp.org/ftp/Specs/html-info/33222.htm). For example, see especially Section 5.4.

In particular, with reference to GBA, 3GPP Specification TS 33.220 defines the components and interfaces that are shown in FIG. 1. These are further described as:

NAF 122, the "Network Application Function" is a server-side component of an application that will be secured using GBA.

BSF, "Bootstrapping Server Function", 130 is a server-side component, which obtains authentication vectors from the HLR/HSS 140, and sends a challenge to the mobile device, "UE", 110 during the GBA protocol. On successful authentication, it derives the shared secret.

HLR/HSS 140, the "Home Location Register" or "Home Subscriber System", is the existing 3GPP system which stores subscription details and credentials (the K and IMSI) for each SIM card (UICC) issued by a mobile operator. It may be "GBA-aware" (so that it stores details for a GBA user subscription) or may be a legacy component.

UE, the "User Equipment", 110 is a mobile device containing a SIM card (UICC). The UE 110 supports a client application which communicates with the NAF 122, as well as a service which interfaces to the UICC, communicates with the BSF 130, and derives the shared secret before passing it to the client application. This service is (somewhat confusingly) called a "GAA Server" in TR 33.905 (entitled "Recommendations for Trusted Open Platforms", it can currently be retrieved at http://www.3gpp.org/ftp/specs/htmlinfo/33905.htm).

Ua 150 is the interface between the Mobile Device (UE) 110 and the Network Application Function (NAF) 120.

Ub 160 is the interface between the Mobile Device (UE) 110 and the Bootstrapping Server Function (BSF) 130. This is specified in detail in TS 24.109 (entitled "Bootstrapping interface (Ub) 160 and network application function interface (Ua) 150; Protocol details", it can currently be retrieved at http://www.3gpp.org/ftp/Specs/html-info/24109.htm).

Zh/Zh' 180 is the interface between the BSF 130 and the HSS or HLR 140. The Zh 180 interface is used with an HSS 140 that is "GBA Aware". The Zh' 180 interface is used with a legacy HLR or HSS 140. The Zh and Zh' 180 interfaces are specified in detail in TS 29.109 (entitled "Generic Authentication Architecture (GAA); Zh and Zn Interfaces based on Diameter protocol; Stage 3", it can currently be retrieved at http://www.3gpp.org/ftp/Specs/html-info/29109.htm) and TS 29.229 (entitled "Cx and Dx interfaces based on the Diameter protocol; protocol details", it can currently be retrieved at http://www.3gpp.org/ftp/Specs/html-info/29229.htm).

Zn 170 is the interface between the NAF 122 and the BSF 130: this can use either a Web Services protocol (SOAP over http) or the Diameter protocol (RFC 3588). This is specified in detail in TS 29.109 (see above).

There are a few other components and interfaces defined within the GAA standards, but these are not described in detail here.

There are several different versions of GBA defined in the standards. The flavours of GBA may include GBA-ME, GBA-U, GBA-SIM etc. The version called "GBA-ME" may require no special customizations of the UICC, except that the UICC does contain a 3G SIM (a USIM). However, other versions may be used. There may be a need to use the 2G variant of GBA (using a SIM rather than a USIM).

SUMMARY OF THE INVENTION

According to a first aspect there is provided a method for communicating between a machine to machine, M2M, device and a device management, DM, server over SMS, the method comprising the steps of:
  obtaining key material, the key material configured to protect data communicated between the M2M device and the DM server;
  protecting data to be communicated using the key material; and
  communicating the protected data between the M2M device and the DM server over SMS.

Therefore, data can be communicated efficiently and securely. Obtaining key material may be by receiving the key material itself or deriving the key material using cryptographic techniques, for example.

Preferably, the key material may be obtained at the M2M device. Alternatively, the key material may be obtained at the DM or another server.

Optionally, the protected data may be communicated between a smartcard (e.g. SIM or UICC) on the M2M device and the DM server. Alternatively, the protected data may terminate on the M2M device outside of a smartcard.

Optionally, the key material may include any one or more of KIc, KID, SPI, and TAR.

Preferably, the data include a constrained application protocol, CoAP, message. This may be a request or a response message, for example.

Optionally, obtaining the key material at the M2M device may comprise:
  a) retrieving the key material from a memory within the M2M device;
  b) retrieving the key material from a smartcard within the M2M device; or
  c) sending data necessary to derive the key material on to the M2M device. In options a) and b), key material may be provisioned at the M2M device in advance. This key material may be a secret shared with the DM server.

Optionally, the data sent in step c) is sent by a bootstrap server. For option c), the key material may be sent or written to the M2M device when required. This key material may be used to set up a permanent or temporary (e.g. session key-based) secure connection. This may be known as: a) factory bootstrapping, b) bootstrap from smartcard, and c) initiated bootstrap, respectively.

Optionally, in step c) sending the data necessary to derive the key material on to the M2M device by a bootstrap server may be performed in response to a request issued by the M2M device. This may be client initiated bootstrap.

Optionally, in step c), the data necessary to derive the key material may be written on to a smartcard within the M2M device. This may be (LWM2M) server initiated bootstrap.

Advantageously, in step c), the key material may be derived using generic bootstrapping architecture, GBA. However, other methods may be used to derive or obtain the key material.

Optionally, the data sent in step c) may be sent by the DM server.

Advantageously, the data sent in step c) may be sent as different data by the DM server at intervals. This may be used to periodically refresh or update key material through the DM server (and not just the bootstrap server).

Preferably, the protected data may be communicated according to the lightweight M2M, LWM2M, protocol.

Preferably, the SMS may secured according to an Over-The-Air, OTA, protocol.

Advantageously, the OTA protocol may be the ETSI standard 102.225.

Optionally, the method may further comprise the steps of:
  determining the MSISDN of an SMS message received by the DM server;
  searching for the MSISDN within a data store; and
  ignoring the SMS message if the MSISDN is not found within the data store. This further improves security. The MSISDN of authorised M2M devices may be registered or stored in the data store before deployment, in advance or as part of a provisioning process, for example.

Preferably, the method may further comprise the step of the M2M device integrity checking and/or decrypting the protected data using the key material.

Optionally, integrity checking and/or decrypting the protected data is executed within a smartcard or other secure execution environment. This further improves security.

Optionally, the protected data may be packet data.

In accordance with a second aspect, there is provided a machine to machine, M2M, device comprising:
  a data store of key material;
  a SMS interface; and
  logic configured to:
    retrieve key material from the data store;
  communicate with a device management, DM, server data protected using the key material using SMS messages through the SMS interface. The SMS interface may be configured to receive and transmit SMS messages.

Preferably, the M2M device may further comprise a smartcard, and wherein the data store is within the smartcard. The data store may also be external to the smartcard.

Advantageously, the logic may be further configured to terminate the SMS messages within the smartcard. The SMS messages may also be terminated outside of the smartcard.

Preferably, the smartcard may be further configured to confirm the integrity and/or decrypt the protected data.

Advantageously, the logic may be further configured to reject and/or discard any SMS messages having protected data that fails confirmation of integrity.

Optionally, the smartcard may be selected from the group consisting of: SIM, embedded SIM, and UICC.

In accordance with a third aspect, there is provided a device management, DM, server comprising:

a data store of key material;
a SMS interface; and
logic configured to:
retrieve key material from the data store;
communicate with a machine to machine, M2M, device data protected using the key material using SMS messages through the SMS interface.

The DM server may further comprise a LWM2M server.

In accordance with a fourth aspect, there is provided a method for securely communicating between a machine to machine, M2M, device and a device management, DM, server, the method comprising the steps of:
communicating key material to the M2M device using the Lightweight Machine to Machine, LWM2M, communication protocol;
communicating data between the M2M device and the DM server according to an over-the-air, OTA, protocol or secured packet structure secured using the key material.

Advantageously, the secured packet structure or OTA protocol may be according to ETSI TS 102.225.

Preferably, the data may be communicated between the M2M device and the DM server over SMS.

Optionally, an LWM2M endpoint may be within a smartcard of the M2M device. This further improves security by the endpoint may instead be within the M2M device.

Advantageously, the communicated data are device management messages. For example, these may be formulated according to CoAP.

In accordance with a fifth aspect there is provided method for securely communicating over SMS comprising the step of:
communicating a SMS containing data having a secured packet structure between a lightweight machine to machine, LWM2M, client and a LWM2M server.

Preferably, the secured packet structure is defined by ETSI TS 102.225.

Preferably, the method may further comprise the step of SMS binding.

Preferably, the method may further comprise the step of decrypting and/or integrity checking the data.

Advantageously, the decryption and/or integrity checking may carried out within a smartcard (e.g. a UICC, SIM card or embedded SIM). Integrity checking may also take place within a device having the LWM2M client (the smartcard may be part of the device).

Optionally, the method may further comprise the step of securing the data by UDP channel security.

In accordance with a sixth aspect there is provided a machine to machine, M2M, device comprising:
a SMS interface;
a lightweight M2M, LWM2M, client; and
logic configured to:
communicate over the SMS interface with a LWM2M server, a SMS containing data having a secured packet structure.

Optionally, the logic may be further configured to bootstrap via UDP binding to provision for use with the LWM2M server.

Optionally, the M2M device may further comprise a smartcard provisioned for use with the L2M2M server.

Preferably, the smartcard may be configured to store SMS binding key parameters.

Advantageously, the logic is further configured to discard, ignore, remove, not process or delete data that are not correctly protected with the stored SMS binding key parameters.

Preferably, the data may be a CoAP request and the logic may be further configured to execute the CoAP request.

Preferably, the logic may be further configured to format the secured packet structure according to the ETSI TS 102.225 standard.

In accordance with a seventh aspect, there is provided a lightweight machine to machine, LWM2M, server comprising:
an SMS interface; and
logic configured to communicate over the SMS interface with a LWM2M client, a SMS containing data having a secured packet structure. This (and any embodiments) may be used in conjunction with the M2M device.

Optionally, the data may be a CoAP request and the logic may be further configured to generate the CoAP request.

Preferably, the logic may be further configured to discard, ignore, delete or not process the SMS if not corrected protected by expected SMS key binding parameters.

Any of the described methods may be implemented as devices, systems, servers and/or networks.

In accordance with a further aspect, there is provided a system comprising one or more of the DM servers and a plurality of the M2M devices.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operation system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
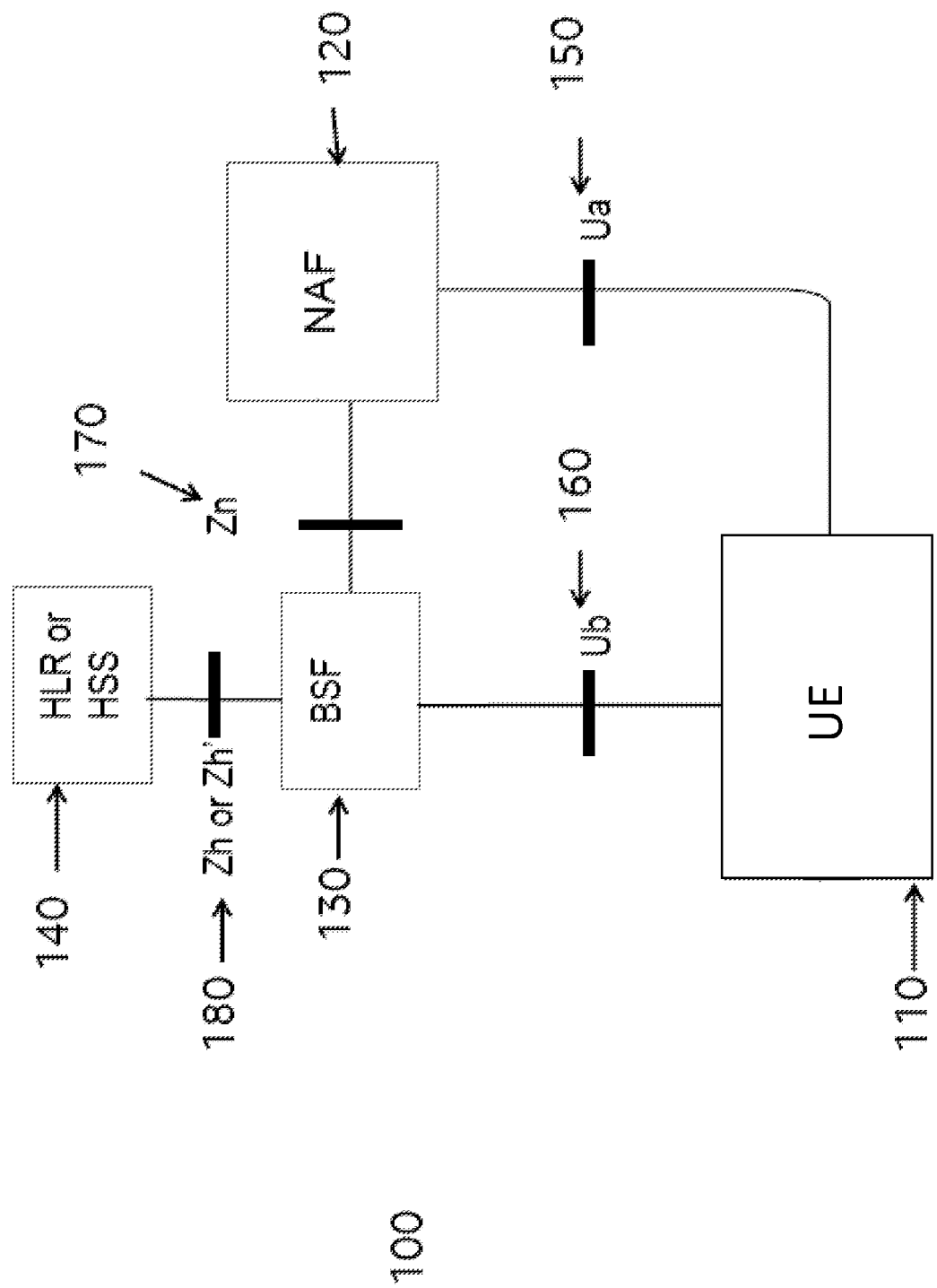
FIG. 1 shows a schematic diagram of components and interfaces with which GBA may be used.

A device may communicate securely with a server. The device may be a Machine to Machine (M2M) device, or an equivalent device (e.g. a device, a generic or specific communication device, including one or more modules capable of providing M2M capabilities).

Aspects of the Generic Authentication Architecture (GAA) and Generic Bootstrapping Architecture (GBA) are identified in "Details of 3GPP standards and technologies used to implement aspects of the method and system" above. In particular, the specific architecture on which the method and system may be based is GBA.

Generic Bootstrapping Architecture (GBA) uses existing security associations between a network (e.g. a mobile network) and a card (e.g. a SIM card or UICC) to derive a key that can be used for the secure communication between the client and the server. Accordingly, if the device is associated with such a card, as well as with the client, the method can advantageously use the GBA to derive the security elements (e.g. a shared secret) to enable the client associated with the device to securely communicate with the server. Accordingly, the device could be advantageously adapted so that it is associated with the card and the client and uses GBA to derive the security elements for secure communication with the server. Moreover, as GBA is standards-based, the impact of the required modifications may be relatively limited and the overall solution would be very attractive (in particular, to M2M users/owners as well as to network operators and/or service providers).

M2M devices are different from the mobile devices that OMA Device Management was originally designed for (such as mobile phones, laptops, computers, as explained in "Details of 3GPP standards and technologies used to implement aspects of the method and system" above), and use of GBA (in any of its versions) with M2M is not a straightforward implementation.

A variant of GBA, called "GBA Push" has been proposed for securing a message between a client and a DM server in the context of OMA Device Management Security, and is identified in "Details of 3GPP standards and technologies used to implement aspects of the method and system" above. It is noted that, although GBA Push and GBA are related, it is not trivial to use GBA in place of GBA Push (and vice versa). This is because these two architectures have some important differences. First, in GBA the device has to contact the BSF in order to request a RAND and AUTN (and use this to derive a Ks_local). To the contrary, in GBA Push, the client does not have to talk to the BSF—it just receives a message prepared by the BSF. Furthermore, in GBA, there is no need to modify the Ua interface. In GBA Push, either the Ua interface has to be modified in some way to carry the push message or a new interface must be added. Accordingly, GBA Push cannot be used with an arbitrary application protocol. For GBA Push, the application protocol has to be "GBA aware" in some sense (e.g. so it can carry the GBA Push Info (GPI) messages). In GBA, the Ks_local can be used to derive several different Ks_NAFs (e.g. for different application servers). In GBA Push, only one NAF can use/rely on the Ks_local. Accordingly, GBA Push is slightly less efficient than GBA.

The GBA Push Info is described in 3GPP TS 33.223, Section 5.2.1. The encoding is defined in Section 5.3.5. See in particular table 5.2.1.1 and FIG. 5.3.5.1 in 3GPP TS 33.223 V12.0.0 (2013-12) that may be found: http://www.3gpp.org/ftp/Specs/archive/33_series/33.223/33223-c00.zip Moreover, as discussed above, M2M devices are very constrained in their capabilities (e.g. computation, communication, life, etc.) and these constraints make their management more complex and harder to implement in a simple manner. GBA requires a number of interfaces and components which are hard to implement with M2M (for examples and description of these interfaces and components, please refer to the sections below).

In order to more efficiently and securely manage the device and/or services provided by (or via) the device, these interfaces and components need to be modified or otherwise adapted so they can properly and effectively work with M2M devices.

For example, carrying the Ub interface (and associated protocol) over constrained M2M devices is very difficult. For example, the standard Ub interface uses HTTP and HTTP digest. The likely rationale for this is that, as mentioned above, GBA was designed having mobile devices, such as mobile phones, in mind. So, since all phones use HTTP, and therefore all have an HTTP stack, then HTTP was the easiest protocol to be used for the Ub interface. However, this is not true for M2M devices. For example, according to the Lightweight M2M (LWM2M) protocol (see below for more details), a protocol called CoAP is used in M2M devices, precisely because it is a simpler/more efficient alternative to HTTP. Alternatively, this Ub interface could be tunnelled, for example via another interface (e.g. the Ua), so that the system may be simplified.

Additionally, building all the necessary components (e.g. GAA server, interfaces) into a capacity-constrained M2M device appears to be very difficult. For example, physical and virtual space constraints, as well as computational constraints, create considerable problems for building the necessary components. Moreover, having one or more interfaces between M2M application(s) and a card on the device, such as a UICC, is very difficult. This is due, for example, to the fact that most M2M modems do not support the required low level interface(s). In general, the overall integration of the GBA required interfaces and components with an M2M device appear very difficult. A possible, but not optimal solution, could be to pre-provision the M2M devices (e.g. having the M2M devices already designed and/or manufactured with the required components and interfaces) and the associated elements required for use of GBA (e.g. the card being capable of interfacing with the M2M device) so that the GBA could be used. To date, no M2M device is pre-provisioned with these characteristics.

In addition, as noted above, GBA is not widely used. There are other reasons why GBA is not widely used. For example, use of GBA requires support in the device, in the network (e.g. BSF—see below) and by individual services (which may be deployed, for example, by a mobile operator or by other parties). In the preferred use-case (mobile broadcast) support is also required in the SIM card (as it uses GBA-U). Accordingly, a lack of coordination and willingness to act/cooperate between the various parties involved in this deployment (e.g. device manufacturers, mobile operators, service providers) has so far blocked implementation of GBA.

For all the above reasons, GBA (or a GBA-like architecture, for example a variant and/or a suitably modified version) may be used for enabling a secure communication with a device (in particular, an M2M device). The communication may be between a server and a client, the client being associated with the device, and wherein this communication may be done for managing the device and/or services provided by (or via) the device. This enables a secure management of that device and/or the services provided by (or via) the device and creates a new and innovative combination which produces a synergistic effect and provides many technical advantages.

For instance, as already mentioned above, the GBA will provide a higher and very strong level of security to the device/service management-related communications with M2M devices, which is a very critical and important point.

Another advantage, in addition or combined with the strong security described above, is in terms of full automation. Moreover, an M2M service provider does not have the cost/complexity of setting up their own security solutions, as the solution can be provided directly by the mobile operator implementing the solution described in this application. In particular, a service provider does not have to set up a PKI, issue certificates, pre-load keys to devices and so on.

Accordingly, the method may further comprise that the provision of the secure communication is based on a security association between a network and a card, the card being associated with the device. For example, the card may be embedded within the device (e.g. soldered in the device) or provided to the device by way of a suitable connection. In general, the card may be associated in any suitable manner so that there is an association between the card and the device. The network can be a mobile network, or any equivalent network, while the card can be a SIM card, a UICC, or any card associated with the network. The method may further comprise deriving a shared secret based on the security association. The method may further comprise providing the client and the server with the shared secret so as to enable the secure communication. The server may be a server adapted to manage the device (e.g. remotely manage the device, send updates, transfer information to and from the device, control device parameters, etc.) and to manage services provided by the device (e.g. device is used to switch on/off and/or dim streetlights). The shared secret may be a key and/or a similar security arrangement.

The method may further comprise authentication between the client and the server. The authentication may be based on the shared secret. The authentication may be performed via an authentication component. The authentication may be performed by means of a first authentication between the client and an authentication component and of a second authentication between the server and the authentication component. The client and the server may be independently authenticated by an authentication component. As a result of the client and the server being authenticated by the authentication component, both the client and the server may share the shared secret. The authentication may be performed by means of the shared secret. The shared secret may be shared between the client and the server. Alternatively, the shared secret may be shared between the client, the server and the authentication component. The authentication may implicitly result from the client, the server and the authentication component sharing the shared secret. The method may further comprise deriving a second shared secret based on the shared secret, the second shared secret being shared between the client and the server. This second shared secret may then be used for the authentication as discussed above.

The obtainment of the shared secret at the client may be based on an identifier associated with a server authentication component. The shared secret may be obtained at the server from the authentication component. The obtainment of the shared secret at the server is obtained based on an identifier associated with the shared secret. The identifier is generated by the authentication component. The identifier may be provided to the server by the client.

The OMA LWM2M protocol for managing (as well as interacting with) M2M devices and managing services provided by M2M devices (as described in "Details of 3GPP standards and technologies used to implement aspects of the method and system") may be used. However, other device management protocols may be used or the method and system may be extended to other M2M services (for example, securing the delivery of binary SMS).

GBA could be advantageously used in conjunction with LWM2M in order, for example, to establish keys for LWM2M, whilst at the same time LWM2M and the procedures specified therein could be used to transport and/or carry any message and/or communication which relates to GBA. For example, this can be done by using specific tunnels (e.g. Ub) or GBA Push Info (GPI) messages. The use of GBA together with LWM2M creates a new and innovative combination which produces a synergistic effect and provides many technical advantages. For example, it allows addressing many more low-end devices, such as M2M devices. This is due, for example, to the use of a device management protocol which is properly optimized for M2M, rather than one repurposed from the consumer space (e.g. OMA DM v1, TR-069). This optimised protocol can be used to transport GBA messages—avoiding the need for a separate HTTP stack—and to manage GBA parameters (identifiers for device and application, lifetimes, key derivation methods, etc.). Further, when accompanied by appropriate network systems to provide automated routing and discovery (e.g. of LWM2M server and BSF), GBA and LWM2M advantageously combine to eliminate the cost of pre-loading settings and credentials, so facilitating low cost devices. GBA with LWM2M securely supports low-cost devices which are unattended or have no UI, where there is no option for user interaction (such as entry of PIN), and where there is no user who is able to notice and recover from authentication failures (spoof server, spoof client or Man In The Middle), Moreover, GBA works without requiring any public key or certificate processing on the device. This is particularly advantageous on simpler devices, as these devices may have minimal public key support or implementation errors when handling certificates.

Accordingly, the shared secret may be used as a key in the LWM2M standard. Also, the LWM2M standard procedures may be used for transmission and/or reception of any communication used within the GBA.

The shared secret may be used as a key or shared secret within the DTLS protocol (identified in "Details of 3GPP standards and technologies used to implement aspects of the method and system" above), either when the LWM2M is used in conjunction with a DTLS protocol or when the DTLS is used alone or in conjunction with one or more other protocols.

The secure communication may further be a data communication. The data communication may be an SMS-based communication. An SMS binding may be used. The data communication may be a UDP-based communication.

The method may further comprise encrypting a communication over the secure data communication. The encryption may be performed using an Advanced Encryption Standard. The SMS-based communication may be further secured by use of an Over-The-Air (OTA) protocol, e.g. a Secured Packet Structure for UICC Applications. This protocol is defined in ETSI standard 102.225. The OTA protocol may be arranged to secure the communication with the identification card associated with the device.

It has also been noted that the OTA protocol can be used advantageously in conjunction with the LWM2M standard, in which the LWM2M can be used to manage parameters, keys and similar elements for the OTA protocol.

The use of OTA with LWM2M is not a straightforward implementation. OTA is a solution designed for SIM card security, as it has some real technical challenges if used for LWM2M. In particular, while there is software written for SIM cards and SIM OTA servers to support ETSI standard 102.225, a similar software does not exist in the device management space for devices (and, in particular, not for OMA DM clients and servers). Thus, M2M device manufacturers do not have a code-base that they can easily adapt for use with these devices.

Further, the ETSI standard 102.225 does not explain how to set up the keys and parameters for use with the standard. It simply assumes the keys and parameters are all pre-loaded and known to both SIM card and OTA server. Although this assumption is acceptable in the SIM space—because SIM cards can be securely provisioned with the necessary keys at the manufacturing stage, and SIM manufacturers have interfaces with operators for communicating the necessary keys and parameters—the same cannot be said about LWM2M, where that infrastructure does not exist.

Thus, the use of OTA together with LWM2M creates a new and innovative combination which produces a synergistic effect and provides many technical advantages. For example, the SMS bearer needs to be secured, and so far no solution has been found. Use of OTA enables the SMS bearer to be used in LWM2M. Without it, it would not be possible to use SMS-based communications in LWM2M, and that would limit the applicability of the overall LWM2M standard.

Accordingly, the LWM2M standard procedures may be used to manage parameters and/or keys used in the OTA protocol. The method may further be used in conjunction with LWM2M, as described above.

It has also been noted that the method described above, implemented using the GBA (or a similar architecture), can be used in conjunction with SMS so that the GBA can be employed to establish keys for secure SMS-based communications (e.g. SMS), while at the same time SMS-based communications can be used to transport or carry messages associated with GBA—for example, carry GBA Push Info (GPI) messages. The use of SMS-based communications together with GBA creates a new and innovative combination which produces a synergistic effect and provides many technical advantages. For example, GBA can be used to establish the shared keys that are needed to protect SMS, while using SMS as a transport to deliver the necessary GBA messages. Further the SMS used to deliver the GBA messages can themselves be integrity protected (and partly encrypted) using the keys that will be established by GBA, so at no point is there a reliance on not secure SMS. This synergistic combination allow use of SMS as the sole bearer for M2M traffic, something which would not otherwise be possible, except by preloading the keys needed to secure SMS traffic, or switching to a different protocol to negotiate these keys: both of these alternatives would add complexity and cost. Thus, it would provide a very high security solution for obtaining shared keys so that the security of the keys is not compromised, and at the same time an-SMS-based communication is enabled by virtue of the provisioning of the keys.

Accordingly, when the method is implemented using GBA, the GBA may be used to establish keys for secure transmission and/or delivery of SMS. SMS-based communications may be used for transmission and/or reception of any communication used within the GBA, noting that these communications may themselves be protected using the keys that will be derived in GBA.

In addition to the above, the server may further comprise a server authentication component. Also, the client may further comprise a client authentication component. The server authentication component may perform authentication of the server with the authentication component. The client authentication component may perform authentication of the client with the authentication component.

Further, the authentication component may be a Bootstrapping Server Function (BSF), the server authentication component may be a Network Application Function (NAF) and the client authentication component may be a GAA Server.

The method may further comprise communicating between the server and the client for determining security parameters to be used for the secure communication, wherein the communicating is performed by using a device management protocol (for example, the GBA). The secure communication may be for use in the device management protocol.

In a further embodiment, there is provided a method of enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. The device can be an M2M device.

In a further embodiment, there is provided an apparatus, system, module or network for enabling secure communication with a device, said communication being between a server and a client, the client being associated with the device. In addition, the apparatus, system, module or network may further include means for performing any one of the steps or features of the methods described above. The device can be an M2M device.

In a further embodiment, there is provided an apparatus, system, module or network for enabling secure communication for use in a device and/or service/application management protocol, the secure communication being between a server and a client, the client being associated with a device, the secure communication requiring security parameters to be agreed between the client and server, the method comprising communicating between the server and client to agree the security parameters, wherein the communicating is performed by using the device management protocol. In addition, the apparatus, system, module or network may further include means for performing any one of the steps or features of the methods described above. The device can be an M2M device.

In a further embodiment, there is provided a client including any means, features or functionalities corresponding to the means, features or functionalities relative to the client as recited by any one of the methods described above.

In a further embodiment, there is provided a server including any means, features or functionalities corresponding to the means, features or functionalities relative to the server as recited by any one of the methods described above.

In a further embodiment, there is provided a device comprising a card and a client, wherein the device is arranged for enablement of secure communication, the secure communication being between a server and the client, wherein the provision of the secure communication is based on a security association between a network and the card. The client may comprise any means, features or functionalities corresponding to the means, features or functionalities relative to the client as recited by any one of the methods described above. The device can be an M2M device.

In a further embodiment, there is provided a server arranged for enablement of secure communication with a device, the secure communication being between the server and a client associated with the device, wherein the provision of the secure communication is based on a security association between a network and a card, the card being associated with the device. The server may comprise any means, features or functionalities corresponding to the means, features or functionalities relative to the server as recited by any one of the methods described above. The device can be an M2M device.

In a further embodiment, there is provided a system for enabling secure communication with a device, said communication being between a server and a client, the client being associated with the device, wherein the provision of the secure communication is based on a security association between a network and a card, the card being associated with the device. The device can be an M2M device.

In a further embodiment, there is provided a method of enabling secure data communication with a device, the communication being between a server and a client associated with the device, wherein the security of the communication is enabled by a bootstrapped secret. The device can be an M2M device. The security protocol may be used to secure the data communication. The bootstrapped secret may be used to obtain the security elements used for the secure protocol. The bootstrapped secret may be a pre-shared secret, said secret being directly provided to the server and the client. The pre-shared secret may be permanently provided to the server and the client (e.g. by pre-provisioning the client and/or the server with said pre-shared secret, e.g. at manufacturing stage or before the client and/or server are used in a system). The pre-shared secret may be a strong, high entropy or a temporary, low-entropy pre-shared secret. The bootstrapped secret may be based on a public key or a certificate-based method. The bootstrapped secret may be provided via a bootstrap server. The security elements can be keys and/or similar arrangements well known in the art.

The communication may be an SMS-based communication. The security protocol is defined by ETSI TS 102.225. The method may use SMS binding. The device may be further associated with a card, and the security of the data communication may be controlled by means of the card. Any incoming SMS-based communication may be decrypted and/or checked by means of the card, and/or any outgoing SMS-based communication may be encrypted and/or checked by means of the card.

The communication may be a UDP-based communication. The security protocol may be a DTLS protocol.

The secure data communication may be provided over a communication interface. The communication interface may be used for managing the device of for managing the bootstrapping operations.

The data communication may be performed according to the LWM2M protocol.

In a further embodiment, there is provided an apparatus, system, module or network for enabling secure data communication with a device, the communication being between a server and a client associated with the device, wherein the security of the communication is enabled by a bootstrapped secret. The device can be an M2M device.

In a further embodiment, there is provided a method of retrieving security elements required for enabling secure data communication with a device, the communication being between a server and a client associated with the device, wherein the security elements are retrieved using a bootstrapping protocol. The device can be an M2M device. The bootstrapping protocol may retrieve the security elements in a secure session. The session may be secured based on a security protocol. The security protocol may be a DTLS protocol. The bootstrapping protocol may be based on GBA. The data communication may be an SMS-based communication. The bootstrapping protocol may be a LWM2M bootstrap protocol. The security elements can be keys and/or similar arrangements well known in the art.

In a further embodiment, there is provided an apparatus, system, module or network for enabling secure data communication with a device, the communication being between a server and a client associated with the device, wherein the security elements are retrieved using a bootstrapping protocol. The device can be an M2M device.

The secure communication may be for the purpose of managing the device and/or the client and/or services (e.g. provided by the device) by the server. Both the device and the server may be machines (i.e. not requiring any human intervention to work). When the device is a machine, the server may be used to manage it. Again, the management may be done without any human intervention (e.g. automatically).

As discussed above, the solution could be used in conjunction with the LWM2M protocol, but the solution could be extended to other Device Management protocols, or to other M2M services (e.g. securing delivery of binary SMS). In particular, and as discussed above, the use of the solution in conjunction with an M2M-specific protocol, such as LWM2M, allows the solution to be very efficient when used with M2M devices, and in particular, when used to manage the device and/or services provided by (or via) the device. In other words, all the advantages mentioned above are further enhanced and optimised when the solution is used in conjunction with an M2M-specific protocol.

In addition, there is also provided any aspects or combination of aspects according to any one of the claims.

Any combination of the features described in connection with any of the aspects is also provided, even if not explicitly disclosed.

Figure 2:
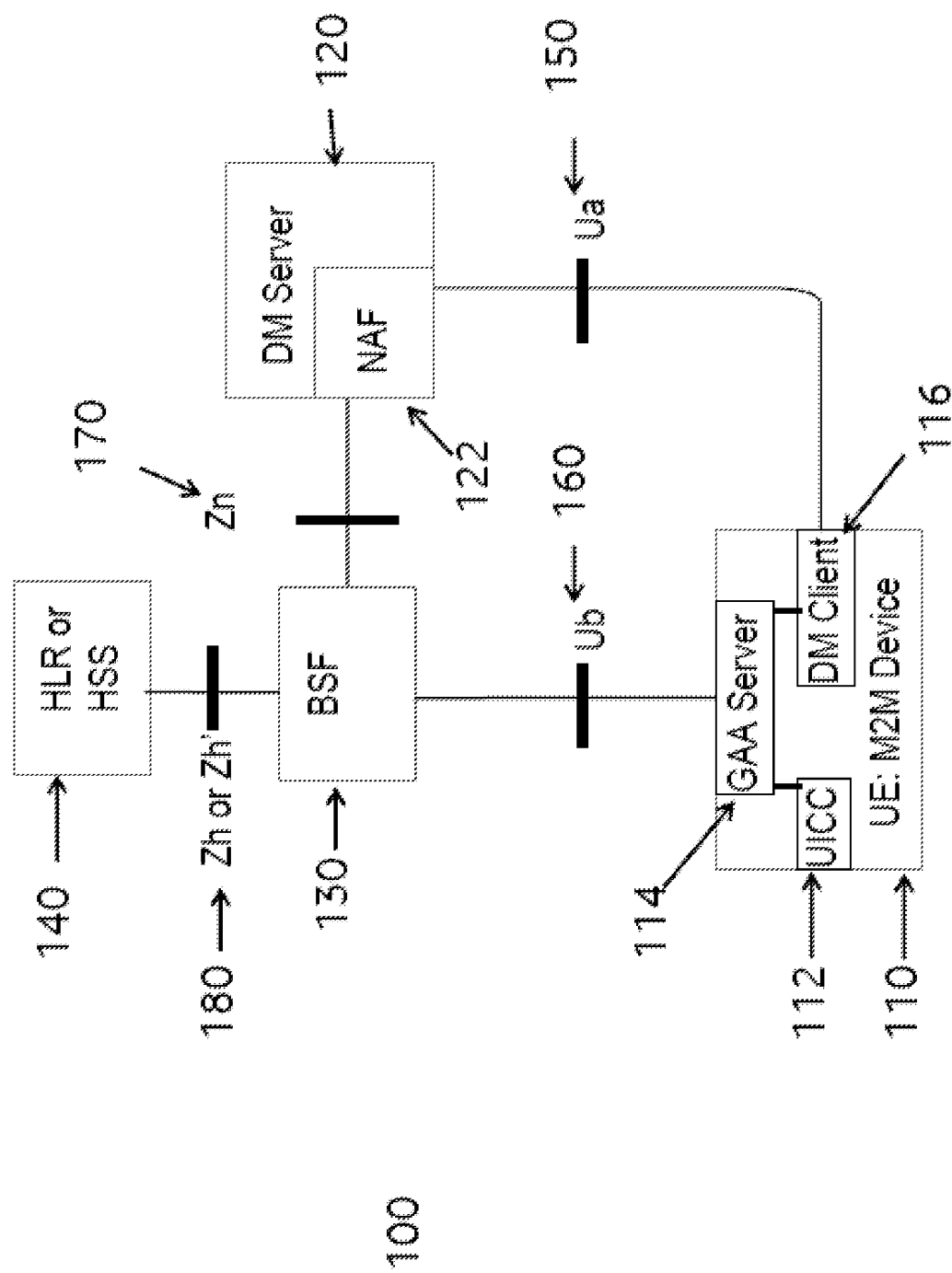
FIG. 2 shows a schematic diagram of an example of an architecture that can be used in accordance with the present invention, in particular when GBA is used.

With reference to FIG. 2, an exemplary architecture (100) is shown that may be implemented, in particular when GBA is used. A device 110 (in the example, an M2M Device and/or a User Equipment) is associated with a card 112 (in the example, a UICC) and a Client 116 (in the example, a Device Management (DM) client. Note that this client could also be an LWM2M Client, namely a client that can manage the device itself and service/applications provided by the device e.g. asset control). The device 110 is also associated with a device authentication component 114 (in the example, a GAA server). Further, a server 120 is provided (in the example, a DM server), the server associated with a server authentication component 122 (in the example, a Network Application Function (NAF)). Further, an authentication component 130 is provided (in the example, a Bootstrapping Server Function (BSF)) and a register 140 (in the example, an HLR or HSS). Also, four different interfaces are provided for communication between the various components, in particular interface Ua 150 between device 110 and server 120, interface Ub 160 between device 110 and authentication component 130, interface Zn 170 between authentication component 130 and server 120, and interface Zh/Zh' between authentication component 130 and register 140.

In particular, with reference to GBA, document TS 33.220 defines the following components and interfaces, which are shown on FIG. 2. NAF, the "Network Application Function", is a server-side component of an application that may be secured using GBA. In a preferred embodiment, the NAF may be a software component within a Device Management (DM) Server.

Some aspects of a BSF, HLR/HSS, UE, Ua, Ub, Zh/Zh' and Zn are provided in "Details of 3GPP standards and technologies used to implement aspects of the method and system" above.

On successful authentication of the device 110, the BSF 130 derives the shared secret Ks_NAF, which is retrieved by the NAF. In a preferred embodiment, the BSF 130 would most likely be on a separate server from the HLR/HSS 140, but within an M2M platform cluster.

The HLR/HSS may be "GBA-aware" (so that it stores details for a GBA user subscription) or may be a legacy component. In a preferred embodiment, the HLR/HSS would be the HLR or HSS of an M2M mobile operator (i.e. one dedicated specifically to serving M2M connections).

The UE 110 is, in the proposed solution, an M2M device.

In a preferred embodiment, the Ua is the interface between a Device Management client 116 and Device Management server 120.

In a preferred embodiment, the Ub would be the interface between the "GAA Server" component 114 of the device and the BSF 130.

In a preferred embodiment, the Zn interface is used.

In the proposed solution, this interface is between the Device Management Server 120 and the BSF 130. The WS version of the interface would allow placement of a DM Server in multiple locations (not just in the M2M operator/platform cluster), and allow future NAFs in multiple locations.

Figure 3:
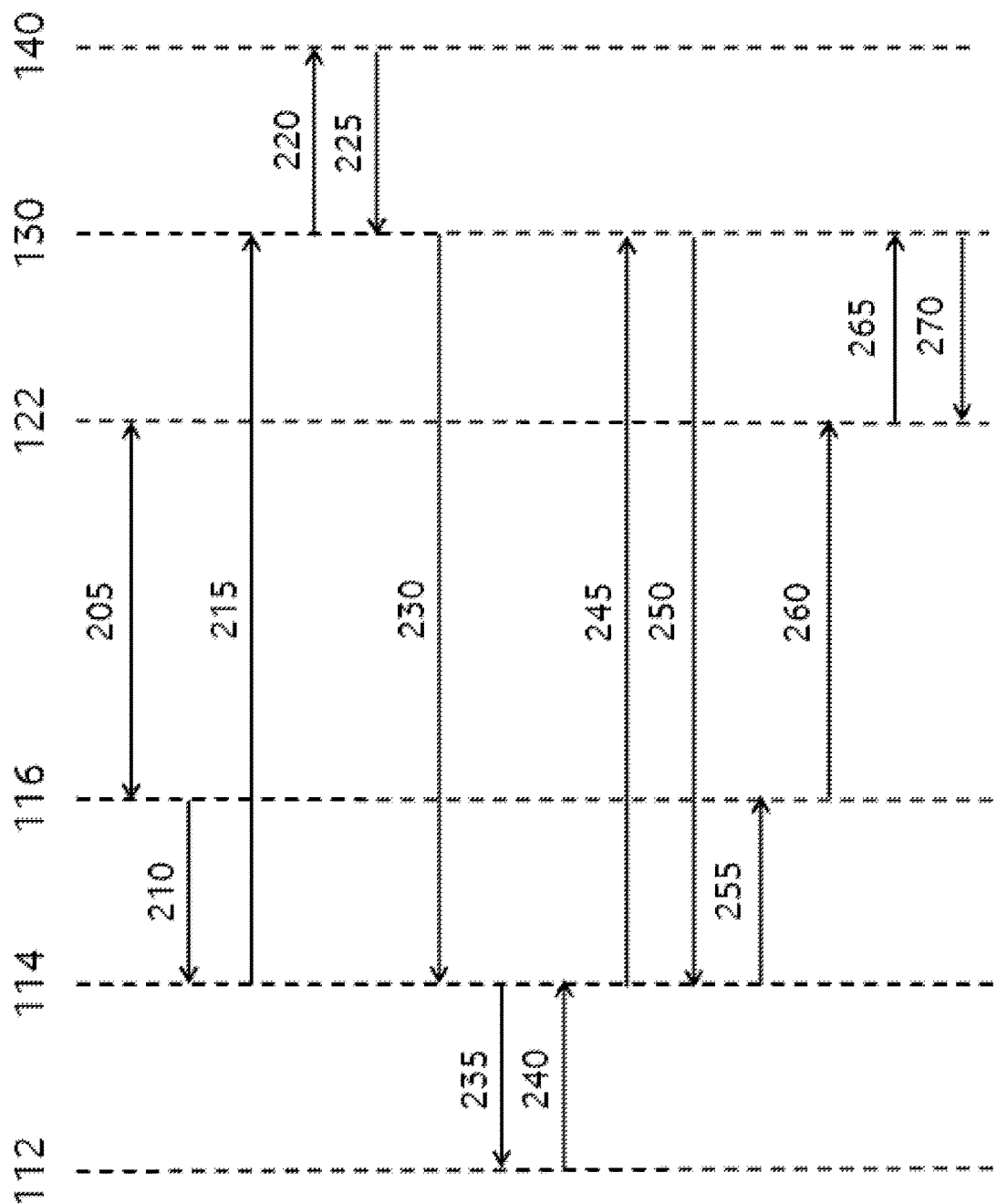
FIG. 3 shows an exemplary flow diagram of communications exchanged within the exemplary architecture of FIG. 2.

With reference to FIG. 3, the procedure for setting up the secure communication in accordance with the present invention is now described, in particular when GBA is used.

At 205, the UE 110 contacts over interface Ua the NAF 122 (in the described embodiment, the Device Management client 116 contacts the Device Management server 122) and discovers that the NAF requires it to acquire a shared secret using GBA. This could be because there is no existing secret, or the existing secret has expired, or is otherwise considered invalid by the NAF.

The exact interface and communication method may be specific to the application concerned. One possible interface and communication method for OMA Lightweight M2M is discussed below.

Over the internal UE interface from DM client to GAA server: at 210, the DM client 116 requests the GAA server 114 to obtain a shared secret. It presents an identifier for the corresponding NAF (NAF_Id).

Over the Ub Interface: at 215, The UE 110 contacts the BSF (GAA Server 114 contacts the BSF 130). This may be a basic http GET request. The UE presents an "IMPI" (equivalent of an IMSI) or a "TMPI" (equivalent of a TMSI) for anonymity reasons, if one is available.

Over the Zh or Zh' Interface: at 220, the BSF 130 requests an authentication vector from the HLR/HSS 140. At 225, the HLR/HSS 140 returns a fresh vector, consisting of a RAND, AUTN, XRES, CK, and IK, for example.

The BSF 130 generates a transaction identifier (B-TID) and passes (230) the B-TID together with the RAND and AUTN back to the UE 110. It may also indicate the lifetime of the B-TID, and the associated key.

Over the internal UE interface from the GAA Server to the UICC: at 235, the GAA Server 114 forwards the RAND and AUTN to the UICC 112 which validates the AUTN. If the AUTN is valid, then the BSF 130 is authenticated. At 240, the UICC 112 returns a RES, CK and IK to the GAA Server 114.

At 245, the UE 110 (GAA Server 114) contacts the BSF 130 again, using the resulting RES for HTTP Digest authentication (which is identified in "Details of 3GPP standards and technologies used to implement aspects of the method and system" above).

The BSF 130 verifies the HTTP Digest using the XRES. If it matches, then the UE 110 has been successfully authenticated. The BSF 130 stores the tuple <IMPI, B-TID, RAND, CK, IK> and tells at 250 the UE 110 that the authentication was successful. The UE 110 stores <B-TID, RAND, CK, IK>.

Over the internal UE 110 interface from DM client 116 to GAA server 114: the UE 110 (GAA Server 114) derives a secret Ks_NAF using the CK, IK, RAND, IMPI and NAF_Id. At 255, it passes Ks_NAF and the B-TID back to the DM client 116.

Over the Ua interface again: at 260, the UE 110 (DM Client 116) contacts the NAF (DM Server 122) and presents the B-TID as retrieved above.

Over the Zn Interface: at 265, the NAF 122 contacts the BSF 130, and presents the BTID. The BSF 130 authenticates the NAF, derives the corresponding Ks_NAF, and at 270 returns it to the NAF, together with an indicator of key lifetime.

The UE 110 (DM Client 116) and NAF (DM Server 122) now both share Ks_NAF. They can use it directly, or to derive their own session keys for further communication.

Again, the exact interface and communication method may be specific to the application concerned. One possible interface and communication method for OMA Lightweight M2M is discussed below.

As discussed above, the solution could be used in conjunction with the LWM2M standard. This standard can be viewed as a successor to existing OMA Device management standards (OMA DM 1.0 to 1.3), but heavily optimized for low end machine-type devices, and with an extended management scope beyond the device itself including the management of services provided by the M2M device such as asset control. This contrasts for instance with OMA DM 2.0 which is the successor for consumer devices like smart-phones, tablets etc. Other widely-used Device Management standards include TR-069, which was developed by the Broadband Forum for managing Customer Premises Equipment (in particular DSL modems).

The exemplary flow described with reference to FIG. 3 is very generic, and can be used with many different sorts of device management protocols (or other application protocols). As can be seen, many details of the Ua interface are outside the scope of 3GPP and are left to other standards to complete (or left to proprietary implementations). However, integration with the LWM2M standard is possible, as described in these examples.

Under the specification (see above), the security for OMA LWM2M is based on DTLS v1.2 (see above) and CoAP (see above). Both the client and server must support pre-shared key DTLS (e.g. see section 7.1.1, page 41), whereas support for certificate-based authentication is only optional. This means that a key derived by GBA (Ks_NAF) could be used as a DTLS pre-shared key and it would work with any DM client/DM server pair.

The general approach for pre-shared key TLS is referenced in "Details of 3GPP standards and technologies used to implement aspects of the method and system" above. The GBA and TLS-PSK protocols work well together. In 205 described above, the "Server Hello" message contains a field where the server can indicate that it supports GBA-bootstrapping, and in response, the client can then provide an identifier (B-TID) for an already bootstrapped key (260). Or if the client doesn't already have a bootstrapped key, it asks the GAA server to get one, before resuming the "Client Hello" and "Server Hello" at 260. The use of the Ks_NAF to derive session keys is then specified entirely within the TLS-PSK protocol. The 3GPP spec assumes HTTP/TLS, but the basic approach looks the same for CoAP/DTLS.

To improve consistency with the OMA profile of GBA, the LWM2M spec may need to define a "protocol identifier" for DTLS pre-shared key and have it registered by OMNA (see section 5.2.1 of OMA GBA Profile, Approved Version 1.1—31 Jul. 2012 found at http://technical.openmobilealliance.org/Technical/release_program/sec_cf_archive.aspx).

Aside from GBA aspects, the M2M device may be configured to support the security of OMA LWM2M, which is referenced in "Details of 3GPP standards and technologies used to implement aspects of the method and system" above.
Additional Aspects
1. Device Development for GBA As can be seen from FIG. 2 and FIG. 3, the M2M device may contain several internal components. It should support a DM client which is "GBA aware", as well as a "GAA Server" component.

The GAA Server component should support internal interfaces to the DM client and to the SIM card (UICC) as well as the external Ub interface to the BSF. The interface to the UICC may be particularly challenging, as the M2M device may not expose an existing API to allow device software to send commands to the UICC. One possibility (that may be used) is for the modem to expose AT commands. However, this may not be at a sufficiently low level (AT+CSIM allows raw APDUs to be communicated to the UICC) in every case. Further, there may be security issues: while the GAA Server must be able to interface to the UICC, general applications installed on the device should not be able to use this interface, as that could allow external parties to impersonate the device (and engender fraud on the cellular network). So the API to the SIM Card should be privileged, as well as being sufficiently low level to be usable.

2. Ub Tunnelling, or GBA Push

The interface to the BSF is based on http and HTTP Digest authentication. One alternative may be "tunnelling" the Ub interface within the Ua interface, so that the device only needs to support the CoAP protocol (not HTTP as well).

A related alternative is using the GBA "Push" variant, and carrying push messages (Upa interface) within the Ua interface. Both of these would require identifying suitable commands and parameters in the Ua interface (i.e. the relevant Device Management protocol) to carry the tunnel or push messages. The interfaces and message flow for GBA push are outlined below (see also 3GPP TS 33.223, entitled "3G Security; Generic Authentication Architecture (GAA); Generic Bootstrapping Architecture (GBA) Push function", it can currently be retrieved by http://www.3gpp.org/ftp/Specs/html-info/33223.htm).

Figure 4:
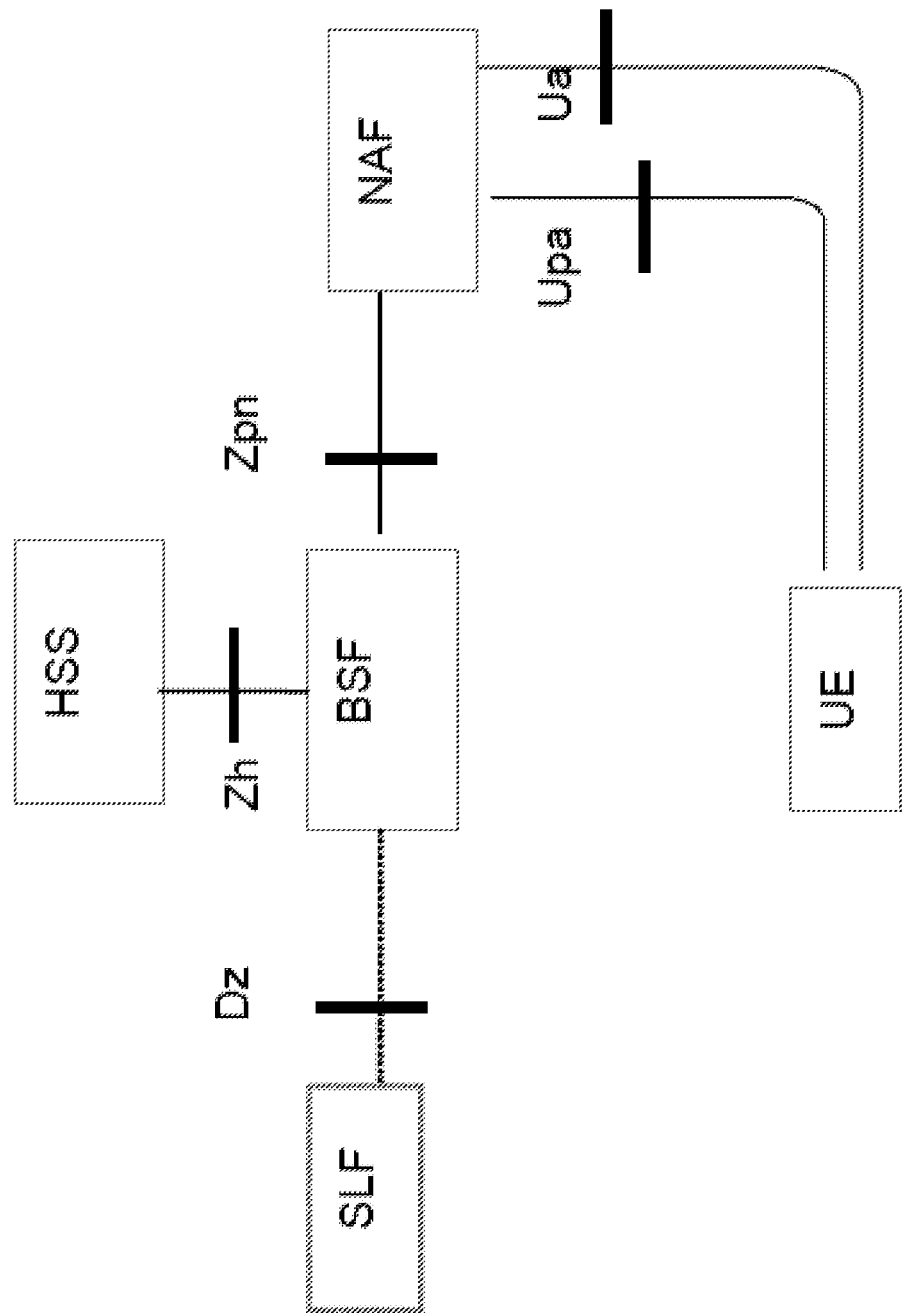
FIG. 4 shows a schematic diagram of an example of an alternative architecture that can be used in accordance with the present invention, in particular when generic bootstrapping architecture (GBA) is used.

With reference to FIG. 4, an example Processing and message flow for GBA Push follows:
1. A NAF establishes a shared NAF SA with a UE which is registered for Push services. It knows the identity of the subscriber.
2. The Push-NAF generates the GPI (GBA Push info) Request and sends the GPI Request to the BSF.
3. Upon receiving the request from the NAF, the BSF checks that the NAF is authorized, and resolves the requested subscriber identifier to a private identifier (e.g. IMSI).
4. The BSF fetches a new AV (authentication vector) and subscriber's GUSS (GBA User Security Settings) from the HSS.
5. The HSS sends the AV and the GUSS to the BSF.
6. When the BSF receives the AV Response from the HSS, it generates the NAF keys based on the requested NAF_Id and creates the relevant GPI Response.
7. The BSF sends the GPI Response to the NAF.
8. The NAF stores the received information together with other user information in a NAF SA.
9. The NAF then forwards the GPI to the UE over Upa using the selected transport mechanism and the given transport address.
10. When the UE receives the message containing the GPI, it processes the GPI as for regular GBA, and stores the corresponding NAF SA(s)

The UE and NAF are now ready to use the established NAF SA.

TR33.223 specifies that Upa is a new interface that is separate from Ua—"a new reference point Upa is introduced between the NAF and the UE" (Section 4.2.1). As such, the Ua interface should be unaware of whether GBA or GBA-push is being used.

3. Provisioning the address of the BSF and the NAF

The address of the BSF (http URL) may be pre-loaded when the device is manufactured. It could be device managed itself, which would seem to create a "chicken-and-egg" problem, but the DM Server could, for instance, provide an address for an acceptable BSF in the ServerHello. Or http traffic might be routed by the M2M mobile operator to a default BSF address. Similarly, the location of the preferred DM Server might need to be pre-loaded, or the M2M mobile operator could route CoAP traffic to a default DM Server address.

4. Flavour of GBA (GBA-ME, GBA-U, GBA-SIM etc.)

Several different versions of GBA are referenced in "Details of 3GPP standards and technologies used to implement aspects of the method and system". GBA-U has security advantages, but also logistic advantages: it permits a longer lifetime for the B-TID as the derived key is stored more securely. It allows safe retention of Ks during poweroff cycles for instance. GBA-U requires specific support from the UICC, so would have a (modest) increment to the cost. Since M2M devices are typically provided with a new UICC anyway at manufacture, it is a software/development cost rather than a hardware cost. Also, in a model with a customised UICC, this may allow for a solution using restricted AT commands to the modem, rather than full AT+CSIM.

5. Location of the NAF (DM Server) and Type of Zn Interface

The architecture example allows for there to be several DM Servers in different locations: it could be part of an M2M platform (e.g. M2M mobile operator) cluster, or hosted elsewhere by a network operator/service provider, or perhaps by a customer of said operator/provider. The BSF may need to be located within a firewalled Demilitarized Zone (DMZ), or perhaps connected via an http proxy in the DMZ (so allowing external http Web Service access from NAFs), and then would execute the Diameter interface to the HLR/HSS. It may be undesirable to expose an http interface directly onto the server supporting the HLR, or to tunnel Diameter through firewalls. However, if the DM Server is itself part of the M2M platform cluster then this may be over-engineering. Possibly, a Diameter solution for the Zn interface then becomes acceptable.

6. Use of Zh or Zh' Interface

Ideally, the HLR may be upgraded to a full HSS with support for the Zh reference point. However, if the HLR/HSS only supports Zh' then the BSF will need to be more complicated, and take on some of the subscription management functions (profiling, lifetime, security policies) typically associated with the HSS.

7. Development of NAF Component

While the NAF functionality looks fairly straightforward, it will need to be developed for each DM Server used, and for each additional application which uses GBA.

GBA keys could be used to protect SMS (e.g. encrypt/integrity protect SMS using a secure packet interface e.g. like ETSI TS 102.225 which is used for SIM OTA). This SMS channel is likely to be more efficient than DTLS.

In addition, regardless of GBA, a secure SMS protocol could be linked to a Device and/or Service management protocol, namely: using a secure SMS protocol (e.g. originally designed for SIM OTA (102 225)), but now adapted for LWM2M communications, combined with using the LWM2M protocol to define (and manage) the necessary parameters for the secure SMS protocol (i.e. the relevant KIc, KID, SPI, TAR, and keys).

GBA could be used to securely derive the keys.

Further aspects and advantageous or preferable features are described in the following paragraphs.

LWM2M needs a security solution for the SMS bearer. Without a solution, SMS will not be usable as a bearer, severely limiting scope of LWM2M. A solution to this problem is to use SIM OTA security (e.g. see TS 102 225).

TS 102.225 relies on the keys and parameters being already agreed between client and server. However, it is difficult to pre-load these into LWM2M client devices, and ensure that they are sent to servers, because there is no present infrastructure for doing so. It would be pointless to deliver the keys and parameters over unsecured SMS.

There are various proposed solutions for delivering these keys and parameters in a secure way.

In a first solution, there is provided switching bearer to UDP/Coap and running DTLS. The DTLS session can be used to secure the LWM2M Bootstrap protocol. The LWM2M Bootstrap can be used to set the TS 102.225 keys and parameters securely. Note that managed resources/objects need to be defined to allow the Bootstrap server to update them; the format of these resources is specified in the numbered paragraphs below.

In a second solution, there is provided relying on a SIM card (UICC) which has already having been provisioned with keys and parameters, and using this card to terminate TS 102 225 security. Please note that, because this solution provides a secure channel, the same channel can be used to deliver other keys and parameters.

In a third solution, there is provided use of GBA to set up the keys and parameters. This works because the GPI (GBA Push Info) can be delivered over unsecured SMS. So, there is no requirement to have an initial key to protect the SMS. (Note that the delivery of the parameters like Kic, KID, SPI and TAR is not obvious, but these are only 6 bytes, and there are fields in the GPI e.g. App_Lbl, NAF_Id, P-TID which could be used to carry this info.)

Further details are provided in the numbered paragraphs below.

UDP channel security for [COAP] is referenced in "Details of 3GPP standards and technologies used to implement aspects of the method and system" above.

Since the LWM2M protocol utilizes DTLS for authentication, data integrity and confidentiality purposes, the LWM2M Client and LWM2M Server SHOULD keep a DTLS session in use for as long a period as can be safely achieved without risking compromise to the session keys and counters. If a session persists across sleep cycles, encrypted and integrity-protected storage SHOULD be used for the session keys and counters.

Note that the Client-Server relationship of DTLS (i.e. who initiated the handshake) is separate from the Client-Server relationship of LWM2M.

Considering that any device with a LWM2M Client can be managed by any LWM2M Server and LWM2M Bootstrap Server the choice of Cipher Suites is not limited to the list defined in Section 9 of [CoAP]. Due to the sensitive nature of Bootstrap Information, particular care has to be taken to ensure protection of that data including constraints and dependencies within a LWM2M Client/Bootstrap Server relationship according to the adopted security mode.

Concerning Bootstrap from a Smartcard, the same care has to be taken and a secure channel between the Smartcard and the LWM2M Device SHOULD be established as described in Appendix H of OMA LWM2M in reference to GlobalPlatform Secure Channel Protocol 03 (SCP 03) Amendment D v1.1 September 2009.

The keying material used to secure the exchange of information using a DTLS session may be obtained using one of the bootstrap modes referenced in "Details of 3GPP standards and technologies used to implement aspects of the method and system" above.

The Resources (i.e. "Security Mode", "Public Key or Identity", "Server Public Key or Identity" and "Secret Key") in the LWM2M Security Object that are associated with the keying material are used either
  1) for providing UDP channel security in "Device Registration", "Device Management & Service Enablement", and "Information Reporting" Interfaces if the LWM2M Security Object Instance relates to a LWM2M Server, or,
  2) for providing channel security in the Bootstrap Interface if the LWM2M Security Object instance relates to a LWM2M Bootstrap Server.

LWM2M Clients MUST either be directly provisioned for use with a target LWM2M Server (Manufacturer Pre-configuration bootstrap mode) or else be provisioned for secure bootstrapping with an LWM2M Bootstrap Server. Any LWM2M Client which supports Client or Server initiated bootstrap mode MUST support at least one of the following secure methods:
1) Bootstrapping with a strong (high-entropy) pre-shared secret, as described in section 7.1 of OMA LWM2M. The cipher-suites defined in this section MUST NOT be used with only a low-entropy pre-shared secret.
2) Bootstrapping with a temporary, low-entropy pre-shared secret (such as a PIN, password and private serial number) using the cipher-suite TLS_ECDHE_PSK_WITH_AES_128_CBC_SHA256, as defined in RFC5489.
3) Bootstrapping with a public key or certificate-based method (as described in sections 7.1.2 and 7.1.3 of OMA LWM2M). The LWM2M client MUST use a unique key-pair, one which is unique to each LWM2M client.

For full interoperability, a LWM2M Bootstrap Server SHALL support all of these methods.

NOTE: The above security methods can also be used by the LWM2M Bootstrap Server to provision KIc and KID for SMS channel security (see below for SMS channel security).

SMS Channel Security
SMS Secured Packet Structure Mode

The Secured Packet Structure is based on [3GPP TS 31 115]/[ETSI TS 102 225]] which is defining secured packets for different transport mechanisms. The solution was originally designed for securing packet structures for UICC based applications, however, for LWM2M it is suitable for securing the SMS payload exchanged between client and server.

The SMS Secured Packet Structure mode specified in this section MUST be supported when the SMS binding is used.

A LWM2M Client which uses the SMS binding MUST either be directly provisioned for use with a target LWM2M Server (Manufacturer Pre-configuration bootstrap mode or Smart Card Provisioning) or else be able to bootstrap via the UDP binding.

The end-point for the SMS channel (delivery of mobile terminated SMS, and sending of mobile originated SMS) SHALL be either on the smartcard or on the device. When the LWM2M Client device doesn't support a smartcard, the end-point is on the LWM2M Client device.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

Device End-Point
If the SMS channel end-point is on the device the following settings SHALL be applied:
Class 1 SMS as specified in [3GPP TS 23.038]
TP-PID of 111101 (ME Data Download) as specified in [3GPP TS 23.040]
TP-OA: the TP-OA (originating address as defined in [3GPP 23.040] of an incoming command packet (e.g CoAP request) MUST be re-used as the TP-DA of the outgoing packet (e.g CoAP response)
Smartcard End-Point
If the SMS channel end-point is on the smart card the following settings SHALL be applied:
Class 2 SMS as specified in [3GPP TS 23.038]. The [3GPP TS 23.040] SMS header MUST be defined as below:

TP-PID: 111111 (USIM Data Download) as specified in [3GPP TS 23.040]
TP-OA: the TP-OA (originating address as defined in [3GPP 23.040] of an incoming command packet (e.g CoAP request) MUST be re-used as the TP-DA of the outgoing packet (e.g CoAP response)

SMS Secured Packet Mode Mechanisms
1. Secure SMS Transfer to UICC

A SMS Secured Packet encapsulating a CoAP request received by the LWM2M device, MUST be—according to [ETSI TS 102 225]/[3GPP TS 31.115]—addressed to the LWM2M UICC Application in the Smartcard where it will be decrypted, aggregated if needed, and checked for integrity.

If decryption and integrity verification succeed, the message contained in the SMS MUST be provided to the LWM2M Client.

If decryption or integrity verification failed, SMS MUST be discarded.

The mechanism for providing the decrypted CoAP Request to the LWM2M Client relies on basic GET_DATA commands of [GP SCP03]. This data MUST follow the format as below
data_rcv::=<address><coap_msg>
address::=TP_OA; originated address
coap_msg::
=COAP_TAG<coap_request_length><coap_request>
coap_request_length::=16 BITS_VALUE
coap_request::=CoAP message payload NOTE: In current LWM2M release, the way the LWM2M Client Application is triggered for retrieving the available message from the Smartcard is at the discretion of the device: i.e a middle class LWM2M Device implementing [ETSI TS 102 223] ToolKit with class "e" and "k" support could be automatically triggered by Toolkit mechanisms, whereas a simpler LWM2M device could rely on a polling mechanisms on Smartcard for fetching data when available.

2. Secured SMS Transfer to LWM2M Server

For sending a CoAP message to the LWM2M Server, the LWM2M Client prepares a data containing the right TP-DA to use, concatenated with the CoAP message and MUST provide that data to the LWM2M UICC Application in using the [GP SCP03] STORE-DATA command.

According to [ETSI TS 102 225]/[3GPP TS 31.115] the Smartcard will be in charge to prepare (encryption/concatenation) the CoAP message before sending it as a SMS Secure Packet ([ETSI TS 102 223] SEND_SMS command).

The SMS Secured Packet MUST be formatted as Secured Data specified in section 7.3.1.2.

The Secure Channel as specified in Annex H SHOULD be used to provide the prepared data to the Smartcard.

The SMS channel security is provided by the Secured Packet Structure [ETSI TS 102 225] and [SCP080] which is defining secured packets for different transport mechanisms. The solution was originally designed for securing packet structures for UICC based applications, however, for LWM2M it is suitable for securing the SMS channel between client and server.

The SMS channel security specified in this section MUST be applied when the SMS binding is used.

When the LWM2M device supports a smartcard, the security SHOULD be terminated on the smartcard. The LWM2M client SHOULD pass SMS messages to the smartcard for encryption and integrity protection before sending, and SHOULD pass encrypted SMS messages received from the LWM2M server to the smartcard for decryption and integrity checking.

A LWM2M Client which supports the SMS binding SHALL support the Secured Packet Structure as defined in [ETSI TS 102 225] and [SCP080]. The LWM2M Client SHALL share the relevant keys—identified by KIc and KID—with a LWM2M Bootstrap Server during bootstrapping, or with a LWM2M Server otherwise.

A LWM2M Bootstrap Server which supports the SMS binding SHALL support the Secured Packet Structure as defined in [ETSI TS 102 225] and [SCP080].

A LWM2M Server which supports the SMS binding SHALL support Secured Packet Structure as defined in [ETSI TS 102 225] and [SCP080].

In SMS Secured Packet Structure mode, a CoAP message as defined in [CoAP] MUST be encapsulated in [3GPP 31.115] Secured Packets, in implementing—for SMS Point to Point (SMS_PP)—the general [ETSI 102 225] specification for UICC based applications.

The following applies to LWM2M Client and LWM2M Bootstrap Server and LWM2M Server:

The "Command Packet" command specified in [3GPP 31.115]/[ETSI TS 102 225] MUST be used for both CoAP Request and Response message.

The Structure of the Command Packet contained in the Short Message MUST follow [3GPP 31.115] specification.

Single DES SHALL NOT be relied on.

AES or Triple DES with three different keys MUST be used.

Preferably, AES should be used. Where AES is used it should be used with CBC mode for encryption (see coding of KIc in [ETSI TS 102 225] section 5.1.2) and in CMAC mode for integrity (see coding of KID in [ETSI TS 102 225] section 5.1.3).

SPI SHALL be set as follows (see coding of SPI in [ETSI TS 102 225] section 5.1.1).

cryptographic checksum ciphering

The ciphering and crypto graphic checksum MUST use either AES or Triple DES

Single DES SHALL NOT be used

AES SHOULD be used

When Triple DES is used, then it MUST be used in outer CBC mode and 3 different keys MUST be used When AES is used it MUST be used with CBC mode for ciphering (see coding of KIc in [ETSI TS 102 225] section 5.1.2) and in CMAC mode for integrity (see coding of KID in [ETSI TS 102 225] section 5.1.3 process if and only if counter value is higher than the value in the RE

Preferably, TAR (see coding of TAR in [ETSI TS 101 220], section 6) SHALL be set to a value in the range BF FF 00-BF FF FF.

NOTE: A TAR for LWM2M SMS security will be requested from ETSI SCP and the range above applies only until the TAR has been assigned.

Secured Data: contains the Secured Application Message which MUST be coded as a BER-TLV, the Tag (TBD: e.g 0x05) will indicate the type (e.g CoAP type) of that message.

There will be two different TARs for terminating the security on the smartcard or on the device.

The ciphering and integrity keys and associated counter values SHOULD be held in a smart card or other tamper-resistant secure storage environment (e.g. embedded secure element). The client SHOULD pass MT SMS to the smart card/SE for decryption and integrity checking, and SHOULD pass MO SMS to the smart card/SE for encryption and integrity protection before sending.

If the keys and associated counter values are not stored in the above recommended way, they SHALL be treated as session keys with a lifetime no greater than the duration of the Registration Lifetime. The LWM2M Client SHALL acquire fresh discard the key material on each "Register" or "Update" operation, load fresh key material using one of the mechanisms described below, and reset the counters.

Re-bootstrapping via the GBA Push mechanism, as described in [OMA DM v2.0] section 9.3.1.3. GBA Push uses a UICC to generate a so called Ks_(ext/int)_NAF shared secret both in the network and in the device. From this master key Ks_(ext/int)_NAF, two session secrets are then generated: the DMBEK and the DMBIK. The value of the KIc (ciphering key for SMS) SHALL be set by truncating DMBEK to the relevant key length (taking bits 0 to 127 for AES-128, or bits 0 to 167 bits for 3DES), and the value of the KID (integrity key for SMS) SHALL similarly be set by truncating DMBIK to the relevant key length (bits 0 to 127 for AES-128, or bits 0 to 167 for 3DES). The GBA Push Info SHALL be delivered to the LWM2M Client using a Class 1 SMS as specified in [3GPP TS 23.038] with a TP-PID of 111101 (ME Data Download) as specified in [3GPP TS 23.040].

Re-bootstrapping from the Smart Card by one of the following methods:

Using the above-described GBA Push mechanism, specifically with GBA-U, and with the Smart Card generating the DMBIK and DMBEK from Ks_int_NAF.

Using Remote File Management (RFM) or Remote Application Management (RAM) as specified in [ETSI TS 102.226]. The LWM2M Server SHALL generate random new key data of appropriate length for KIc and KID and ensure these are delivered to the Smart Card by a Class 2 SMS as specified in [3GPP TS 23.038] with a TP-PID of 111111 (USIM Data Download) as specified in [3GPP TS 23.040], protected using the relevant OTA security keys for RFM or RAM.

The Smart Card SHALL place the updated session keys in the provisioning file EF_LWM2M_Bootstrap.

Re-bootstrapping via the UDP binding, secured as described in Section 7.1 (UDP Security).

Where the UDP binding is unavailable, the LWM2M Server (or Bootstrapping Server) SHOULD send SMS to the LWM2M Client to refresh the session keys before the next attempted "Register" or "Update" operation. If the LWM2M Client attempts to contact the LWM2M Server using an expired registration, or attempts to "Register" or "Update" using a stale key, the LWM2M Server SHALL respond with an error (4.00 Bad Request) and SHALL send SMS to refresh the session keys. However, the LWM2M Server SHOULD send such SMS prior to the expiry of the current Registration, if the LWM2M Client is awake; or if the LWM2M Client is in a sleep cycle, the LWM2M Server (or Bootstrapping Server) SHOULD send such SMS on the next wake up. These measures will avoid a failed "Register" or "Update" operation.

As for Section 7.1 (UDP Security), where a session persists across sleep cycles, encrypted and integrity-protected storage SHOULD be used for the session keys and counters. Alternatively, new session keys SHALL be established by one of the above mechanisms on wake up from a sleep cycle.

Preferably, KIc, KID, SPI and TAR SHALL be stored in the "SMS Binding Key Parameters" Resource.

Preferably, the corresponding key values should be stored in the "SMS Binding Secret Keys" Resource.

A LWM2M Client which uses the SMS binding may either be directly provisioned for use with a target LWM2M Server (Manufacturer Pre-configuration bootstrap mode) or else be able to bootstrap via the UDP binding.

A LWM2M Client, Server or Bootstrap Server supporting SMS binding SHALL discard SMS messages which are not correctly protected using the expected parameters stored in the "SMS Binding Key Parameters" Resource and the expected keys stored in the "SMS Binding Secret Keys" Resource, and SHALL NOT respond with an error message secured using the correct parameters and keys.

LWM2M Object: LWM2M Security

Description: This LWM2M object provides the keying material of a LWM2M Client appropriate to access a specified LWM2M Server. One Object Instance SHOULD address a LWM2M Bootstrap Server These LWM2M object resources MUST only be changed by a LWM2M Bootstrap Server or SmartCard provisioning and MUST NOT be accessible by any other LWM2M Server.

Example Object Info:

| Object | Object ID | Object URN | Multiple Instances? | Mandatory? |
|---|---|---|---|---|
| LWM2M Security | 0 | | Yes | Yes |

Resource Info:

| Resource Name | Type | Range or Enumeration | Units | Descriptions |
|---|---|---|---|---|
| LWM2M Server URI | String | 0-255 bytes | — | Uniquely identifies the LWM2M Server or LWM2M Bootstrap Server, and is in the form: "coaps://host:port", where host is an IP address or FQDN, and port is the UDP port of the Server. |
| Bootstrap Server | Boolean | | — | Determines if the current instance concerns a LWM2M Bootstrap Server (true) or a standard LWM2M Server (false) |
| Security Mode | Integer | 0-3 | — | Determines which UDP channel security mode is used<br>0: Pre-Shared Key mode<br>1: Raw Public Key mode<br>2: Certificate mode<br>3: NoSec mode |
| Public Key or Identity | Opaque | | — | Stores the LWM2M Client's Certificate (Certificate mode), public key (RPK mode) or PSK Identity (PSK mode). The format is defined in Section E.1.1. |
| Server Public Key or Identity | Opaque | | — | Stores the LWM2M Server's or LWM2M Bootstrap Server's Certificate (Certificate mode), public key (RPK mode) or PSK Identity (PSK mode). The format is defined in Section E.1.1. |
| Secret Key | Opaque | | — | Stores the secret key or private key of the security mode. The format of the keying material is defined by the security mode in Section E.1.1. This resource MUST only be changed by a bootstrap server and MUST NOT be readable by any server. |
| SMS Security Mode | Integer | 0-255 | — | Determines which SMS payload security mode is used (see section 7.2)<br>0: Reserved for future use<br>1: Secure Packet Structure mode device terminated<br>2: Secure Packet Structure mode smartcard terminated<br>3: NoSec mode<br>255: Proprietary modes |
| SMS Binding Key Parameters | Opaque | 6 bytes | — | Stores the Klc, KID, SPI and TAR. The format is defined in Section D.1.2. |
| SMS Binding Secret Keys | Opaque | 32-48 bytes | — | Stores the values of the keys for the SMS binding. This resource MUST only be |

| Resource Name | Type | Range or Enumeration | Units | Descriptions |
| --- | --- | --- | --- | --- |
| LWM2M Server SMS Number | Integer | | | changed by a bootstrap server and MUST NOT be readable by any server. MSISDN used by the LWM2M Client to send messages to the LWM2M Server via the SMS binding. The LWM2M Client SHALL silently ignore any SMS not originated from unknown MSISDN |
| Short Server ID | Integer | 1-65535 | — | This identifier uniquely identifies each LWM2M Server configured for the LWM2M Client. This resource MUST be set when the Bootstrap Server resource has false value. Default Short Server ID (i.e. 0) MUST NOT be used for identifying the LWM2M Server. |
| Client Hold Off Time | Integer | | s | Relevant information for a Bootstrap Server only. The number of seconds to wait before initiating a Client Initiated Bootstrap once the LWM2M Client has determined it should initiate this bootstrap mode |

UDP Channel Security: Security Key Resource Format

This section defines the format of the Secret Key and Public Key and Identity resources of the LWM2M Server and LWM2M Bootstrap Objects when using UDP Channel security. These resources are used to configure the security mode and keying material that a Client uses with a particular Server. The Objects are configured on the Client using one of the Bootstrap mechanisms described in Section 5.1 of OMA LWM2M. The use of this keying material for each security mode is defined in Section 7.1 of OMA LWM2M.
Pre-Shared Key (PSK) Mode The PSK is a binary shared secret key between the Client and Server of the appropriate length for the Cipher Suite used [RFC4279]. This key is composed of a sequence of binary bytes in the Secret Key resource. The default PSK Cipher Suites defined in this specification use a 128-bit AES key. Thus this key would be represented in 16 bytes in the Secret Key Resource.

The corresponding PSK Identity for this PSK is stored in the Public Key or Identity resource. The PSK Identity is simply stored as a UTF-8 String as per [RFC4279]. Clients and Servers MUST support a PSK Identity of at least 128 bytes in length as required by [RFC4279].
Raw-Public Key (RPK) Mode The raw-public key mode requires a public key and a private key of the appropriate type and length for the Cipher Suite used. These keys are carried as a sequence of binary bytes with the public key stored in the Public Key or Identity Resource, and the private key stored in the Secret Key Resource. The default RPK Cipher Suites defines in this specification use a 256-bit ECC key. Thus the Certificate Resource would contain a 32 byte public key and the Secret Key Resource a 32 byte private key.
Certificate Mode The Certificate mode requires an X.509v3 Certificate along with a matching private key. The private key is stored in the Secret Key Resource as in RPK mode. The Certificate is simply represented as binary X.509v3 in the value of the Public Key or Identity Resource.
SMS Payload Security: Security Key Resource Format This section defines the format of the Secret Key and Public Key and Identity resources of the LWM2M Server and LWM2M Bootstrap Objects when using SMS Payload security. These resources are used to configure keying material that a Client uses with a particular Server. The Objects are configured on the Client using one of the Bootstrap mechanisms described in Section 5.1. The use of this keying material is defined in Section 7.2. The SMS key parameters are stored in the order KIc, KID, SPI, TAR (KIc is byte 0).

Ordering of bits within bytes SHALL follow ETSI TS 102 221 "Coding Conventions" (b8 MSB, b1 LSB).
Unbootstrapping If a Security Object Instance is to be deleted, some related resources and configurations need to be deleted or modified. Therefore when Delete operation is sent via Bootstrap Interface, the Client MUST proceed following procedure.

1. If there is an Object Instance that can be accessed only by a Server of the Server Object Instance (i.e. the Server is Access Control Owner and the LWM2M Server can access the Object Instance only in an Access Control Object Instance), the Object Instance and the corresponding the Access Control Object Instance MUST be deleted
2. If an Object Instance can be accessed by multiple Servers including the Server which Security Object Instance is to be deleted, then:
    An ACL Resource Instance for the Server in Access Control Object Instance for the Object Instance MUST be deleted
    If the Server is Access Control Owner of the Access Control Object Instance, then the Access Control Owner MUST be changed to another Server according to the rules below: The Client MUST choose the Server who has highest sum of each number assigned to an access right (Write: 1, Delete: 1) for the Access Control Owner. If two or more Servers have the same sum, the Client MUST choose one of them as the Access Control Owner.
3. Observation from the Server MUST be deleted
4. The Server Object Instance MUST be deleted
5. Client MAY send "De-register" operation to the Server
Note: To monitor the change of Access Control Owner, the Server MAY observe Access Control Owner Resource.

Figure 5:
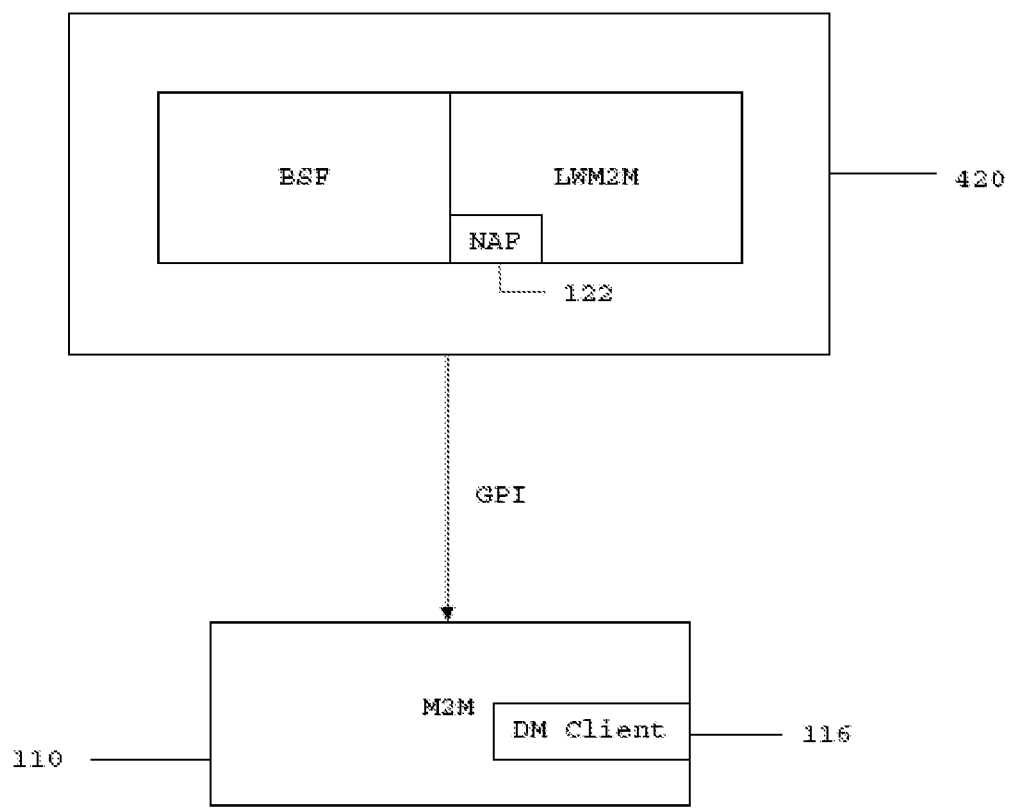
FIG. 5 shows a schematic diagram of a device management (DM) server in communication with a Machine to Machine (M2M) device.

As a further enhancement, the GBA BSF may be merged into the LWM2M bootstrap server. This makes it easier to discover a single server. This is shown in FIG. 5 in which a combined server 420 holds both the BSF 130 and the LWM2M 440.

Figure 6:
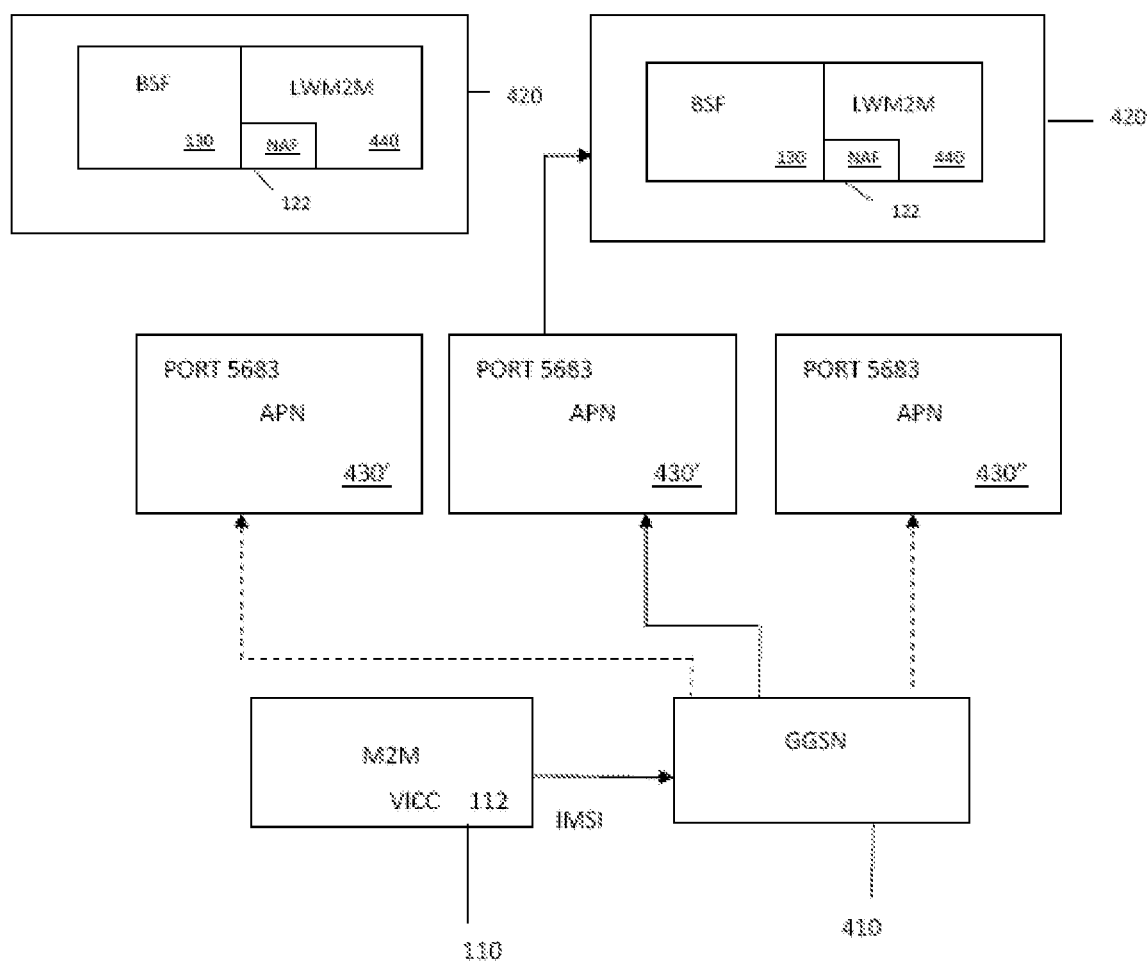
FIG. 6 shows a schematic diagram of a system and method for initiating communications between the DM server and M2M device of FIG. 5.
Figure 7:
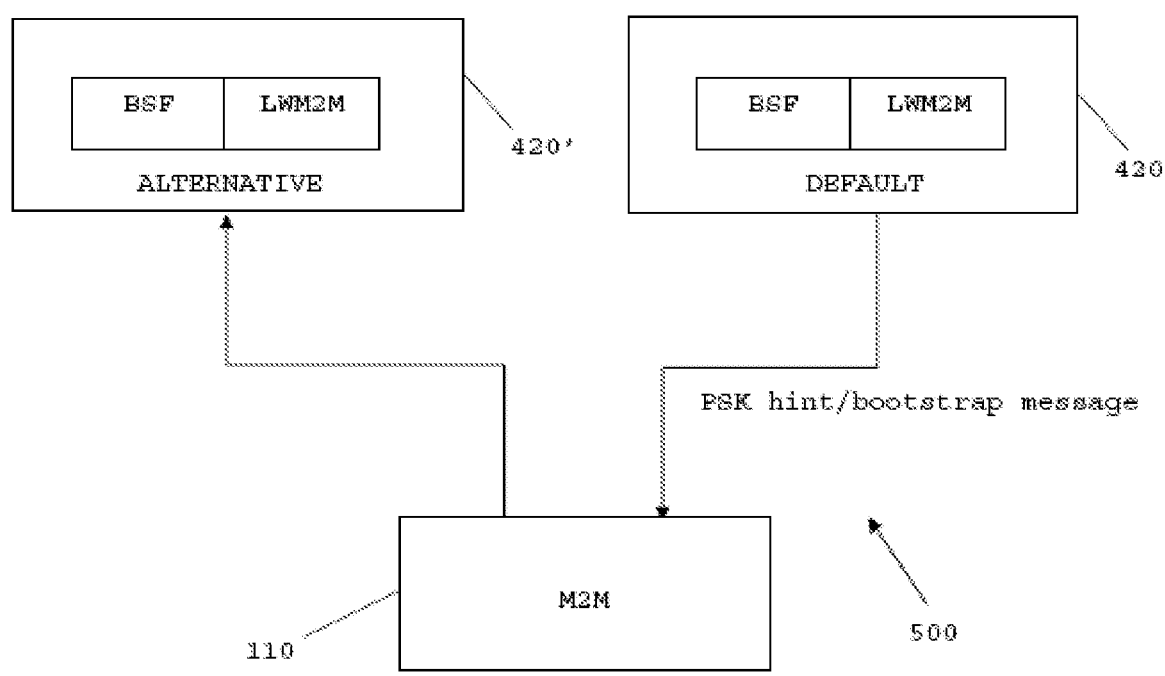
FIG. 7 shows a schematic diagram of a further system and method for initiating communications between the DM server and M2M device of FIG. 5.

FIGS. 6 and 7 show schematic diagrams indicating how the combined BSF LWM2M server may be reached by the M2M device 110. Whilst the combined BSF LWM2M 420 are shown in FIGS. 6 and 7, other embodiments may operate where the BSF and LWM2M are embodied as separate entities (e.g. as shown in FIG. 2). However, the same or similar discovery techniques may be used, as described below.

The M2M device 110 requires some mechanism for finding a server and in particular the LWM2M server (DM server) or the BSF server. As described previously, the LWM2M server uses interface Ua and the BSF server uses interface Ub. The M2M device 110 therefore requires the correct IP addresses, URLs and/or ports to contact and communicate with the various servers. As discussed previously, it may not be particularly feasible or convenient to pre-provision the M2M device 110 with all necessary addresses and URLs as this would require such settings to be specified at the date of manufacture and it would not be easy to change or alter these data later on. The OMA device management standards propose the use of a bootstrapping server to load the relevant server details of a DM server. However, this transfers the problem to one of provisioning the details on the bootstrapping server.

Figure 8:
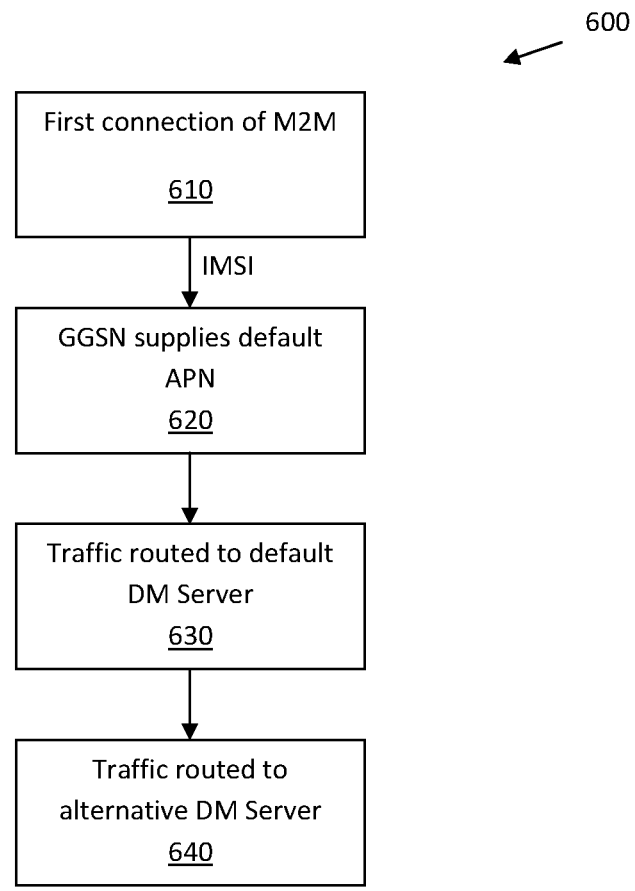
FIG. 8 shows a flowchart of the method of FIG. 7.

The following describes how routing infrastructure may be used to achieve automated discovery of the LWM2M (DM) server and/or BSF. An example of this method 600 is shown as a flowchart in FIG. 8. A gateway GPRS support node (GGSN) 410 supplies a default access point name (APN) 430 to act as a default routing for CoAP traffic 620 when the M2M device 110 first connects 610. Therefore, traffic may be automatically routed 630 to a default DM server 420. The GGSN 410 may vary the default server (e.g. LWM2M/BSF combination server) 420 depending on the IMSI provided by the M2M device 110 (certain groups of IMSI numbers may be routed to one server 420 and other IMSI number groups may be routed to a different server 420').

Furthermore, CoAP traffic will have a dedicated port (5683) and so a short-lived default routing rule may be applied for this port. In other words, all communications on this port may be sent to a default LWM2M/BSF combination server 420 (DM server) or there may be a short-lived default routing for all UDP traffic, for example. There may be similar default routing rules for HTTP traffic (BSF 130) or all TCP traffic, or a default DNS which sends all HTTP traffic to the BSF 130 until device management configuration is completed.

Once the default DM server 420 has been reached (either by the method 400 described with respect to FIG. 6 or 8 or by other means) the default server 420 may indicate an address for an alternative server 640 and/or preferred BSF server (e.g. LWM2M/BSF server 420' combination). This may allow for load balancing or other network configurations to be achieved. FIG. 7 shows how this can be done in schematic form. The default DM server 420 may provide the M2M device 110 with a pre-shared key (psk) hint including the alternative server's 420' address details. For example a psk hint may be included when running TLS or DTLS. The alternative server's 420' address may be supplied using other mechanisms. The APN (and so routing) may be assigned or reassigned based on other detected properties or parameters such as the present APN or a characteristic of the communication traffic between the M2M device and the server 420, for example.

For example, a LWM2M bootstrap message may use a write logical operation (message) on custom resources (such as a "NAF_ID" and "BSF_ID"). If the write message contains no security then the M2M device may formally reject the write operation but may use the information that the write operation contains to derive the address of the alternative server 420'. In other words, the write logical operation fails (as intended) but the message that was received contains enough information to allow the M2M device 110 to locate the alternative server 420'.

As described with reference to FIG. 5, the BSF may be merged into the LWM2M bootstrap server 440 to form a combined DM server 420. Therefore, there will be only a single entity to discover. In the write bootstrap message described with reference to FIG. 7, the LWM2M bootstrap server 440 may deliver credentials for interacting with an alternative or production DM server 420'. Therefore the write message instructs the M2M device to write to a Server Access Security Object (but this message is intended to fail authentication). The combined BSF/LWM2M server 420 may deliver a GBA Push Info (GPI) message which allows the relevant production credentials to be derived on the M2M device 110. This optimisation may lead to a particularly simplified BSF 130.

Extensions for Use with Public Key Solutions

One problem with the key(s) derived using GBA is that they are based on the long-term secrecy of the underlying (U)SIM key, K or Ki. If that key ever leaks in the future, or if the operator is forced to disclose it for some reason, then any derived keys ever used in GBA may be considered compromised. An adversary or third party who had been recording all conversations with a device may potentially recover all past keys and messages protected by them.

One solution for this is to ensure that the GBA keys are only used temporarily when enrolling in a public key scheme: that scheme may for instance support "perfect forward secrecy" which avoids the problem of future key compromise leading to a recovery of all encrypted messages.

The 3GPP standard (GAA) provides some methods for using GBA to enroll for public key certificates. However, but they are particularly complex, and the necessary public key infrastructure (PKI) may be too great an overhead for LWM2M or other M2M protocols.

Authenticate "Raw" public keys from the client:

The M2M device may have a preloaded public-private keypair, or may generate a public-private key-pair on first power up. It presents its "raw public key" (or a hash of the raw public key) to the BSF, protected using HTTP digest and RES (this could be over a tunnelled Ub protocol, since that already requires some customisation). Alternatively, the raw public key may be presented to the NAF (LWM2M server or LWM2M bootstrapping server) protected using the GBA-derived key Ks_NAF. (The device could, for example, present its raw public key over CoAP, integrity protected using Ks_NAF, or present it within a CoAPs session secured using a pre-shared-key cipher suite and Ks_NAF).

The DM server (or bootstrapping server) may then use one of the public key ciphersuites, such as:
TLS_ECDHE_ECDSA_WITH_AES_128_CCM_8 as defined in Section 9.1.3.2 of [CoAP]
TLS_ECDHE_ECDSA_WITH_AES_128_CBC_SHA256 as defined in [RFC5289]
Alternatively, the DM Server may use a mixed pre-shared key/public key ciphersuite like:
TLS_ECDHE_PSK_WITH_AES_128_CBC_SHA256, as defined in [RFC5489] using the Ks_NAF as the pre-shared key.

Preferably, these ciphersuites may provide perfect forward secrecy. There may be several procedures that can be carried out before a Ks_NAF is established. In particular, these procedures may be carried out for devices that don't support GBA, or where the SIM card of the M2M device is not yet provisioned for GBA.

The device may present its raw public key unauthenticated, and the DM server or Bootstrapping may accept this raw public key temporarily. The device may use a weak secret (like PIN+IMSI+IMEI) together with TLS_ECDHE_PSK_WITH_AES_128_CBC_SHA256, for example, to secure a first connection with a bootstrap server.

These back-up methods provide no (or weak) authentication of the device public key, but they at least allow the protocol to get started, including providing the connectivity to tunnel GBA or run GBA-push, and so establish a subsequent strong authentication of the device pubic key.

Authenticate "Raw" Public Keys from the Server.

As an alternative, or in addition to the above-mentioned procedure for authenticating "Raw" public keys from the client, the DM server may present its own "raw public key" to the client, protected by HTTP digest and RES, or other techniques, or by an integrity check or PSK session set up using the GBA-derived key Ks_NAF, for example. The similar cipher-suites to those described above may also be used to provide perfect forward secrecy.

If there has been no opportunity to establish a Ks_NAF then the device may require a preloaded copy or digest of the expected public key (e.g. the public key used by the LWM2M Bootstrap server) or a pre-loaded weak secret. This digest or secret may be retrieved from the SIM card (UICC) to avoid the need to provision directly to the device at manufacture. In an alternative, it may be sent to the device by SMS or the device may accept the raw server public key unauthenticated, at least at first connection.

Again, these back-up methods provide no (or weak) authentication of the server public key, but they at least allow the protocol to get started, including providing the connectivity to tunnel GBA or run GBA-push, and so establish a subsequent strong authentication of the server pubic key.

The above-mentioned techniques for authenticating "Raw" public keys from the client may also apply to certificate modes e.g. instead of a raw public key, the device may present a self-signed certificate (or certificate signed by an unknown CA). The server may present a self-signed certificate, or an unknown root CA certificate to M2M device. This also avoids the complexity and expense of provisioning the M2M device at manufacture with a public key certificate signed by a pre-existing CA (e.g device manufacturer's CA) or provisioning multiple root certificates.

These embodiments also allow the frequent refresh of private/public keys or certificates, which addresses some revocation problems. However, there is no need to do revocation checking, as the private/public key doesn't last long. The lifetime of the private/public key may be linked to the lifetime of a B-TID (or key_LT).

Alternatively, GBA could be used to secure messages from a trusted timesource (e.g. a network time), or provide a secure channel to retrieve certificate validation information (CRLs or OCSP responses.) This can address some problems with obtaining correct and up-to-date information for certificate validation.

The following describes particular uses of the perfect forward security and authentication of raw public key procedures or other secure communication methods. These include secure firmware updates, and secure broadcasts.

A M2M client device may be advised of a different server-side public key. This different public key may be used to sign firmware updates (over a unicast, broadcast or multicast or peer-to-peer system, for example).

This functionality may be extended to other sorts of secure broadcast, for example distributing a public key to sign public warning messages (bomb alerts, tsunami alerts), emergency messages (ambulance approaching, get out of the way), traffic alerts etc.

This procedure has the advantages of reduced or no PKI, and no or easier certificate validation. A public key (protected by a key established using GBA) may be sent where the public key is then used to verify broadcast messages or firmware updates, for example.

The LWM2M specification doesn't have a broadcast channel and firmware updates in LWM2M operate as follows:

The LWM2M Server performs a "Write" (or "Create") operation to alter (or create a new instance of) a "Firmware Update" object. It may write the update itself to a "Package" resource, but since updates are often large (and difficult to carry over CoAP), it most likely writes a URI to the "Package URI" resource.

If the "Package URI" resource has been written to, then the LWM2M Client "performs the download at the next practical opportunity". While downloading, the LWM2M client sets the "State" resource to "2" (which means "Downloading"). On completion of download, the LWM2M client sets the "State" resource to "3" (which means "Downloaded"). If the "Package" resource was written to directly, then when the LWM2M client has completed the Write operation, it sets the "State" resource to "3" straight away.

The LWM2M server can perform a "Read" operation whenever it likes in order to find out the value of the "State". When the state is "3" it can then perform an "Execute" operation on the "Update" resource, which instructs the LWM2M client to install the firmware update.

The LWM2M client sets the "Update Result" resource to indicate whether the update succeeded or failed, and any reason for failure. The client also sets the "State" resource back to "1" (which means "Idle").

The LWM2M server can perform another "Read" operation whenever it likes in order to find out the value of the "Update Result" and "State" resources.

No verification of the update package occurs in this process.

However, the following describes improvements to this method. These are illustrated in two example mechanisms. In these examples, a key is carried within LWM2M operations.

Mechanism 1

The LWM2M server performs a "Write" operation on the "Package" resource, but rather than writing the firmware update itself, it writes the (typically public) key that the LWM2M client requires in order to verify the firmware update. The LWM2M server simultaneously (or sequentially) performs a "Write" operation on the "Package URI" resource, telling the LWM2M client where it can find the update itself.

NOTE: The URI here may well take the form of a broadcast URI, for example—see http://tools/ieft.org/html/rfc2838—or http://www.etsi.org/deliver/etsi_ts/102800_102899/102851/01.01.01_60/ts_102851v010101p.pdf Once the LWM2M client has downloaded the update, then it can verify it using the public key that was written in the "Package" resource.

Mechanism 2

The LWM2M server performs a "Write" operation on the "Package URI" resource, but the URI contains an encoding of the public key that will be needed to verify the firmware update. For example, take the form of:

dvb://channel135/key=9ICYfQ4RHZO3a3jb6hrQWRQiga7ImCqCaG9JemD7F6r

Once the LWM2M client has downloaded the update, then it can verify it using the public key that was contained within the "Package URI" resource.

A key established by GBA may be used to secure a session between the LWM2M client and LWM2M server (for example the Ks_NAF is used as a DTLS pre-shared key) and then the second key is provided within that secured session.

Figure 9:
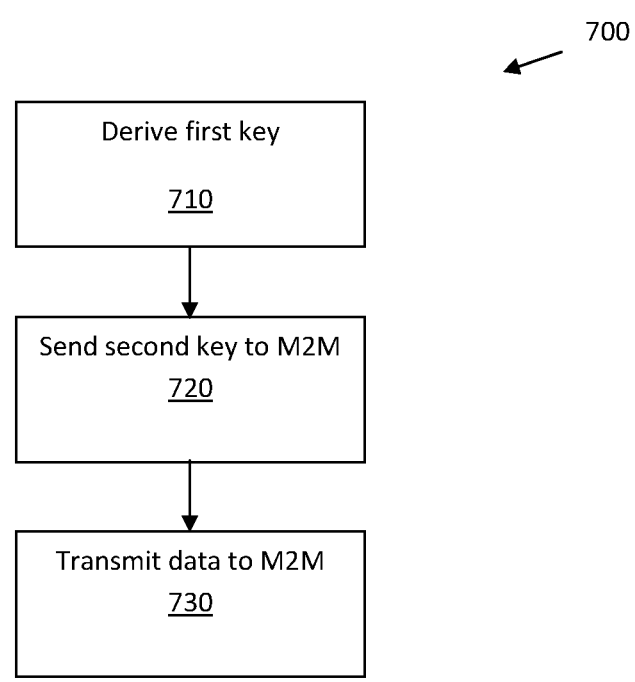
FIG. 9 shows a flowchart of a method for communication with a M2M device.

FIG. 9 shows a flowchart of a method 700 for communicating with a M2M device. At step 710, a first key is derived either by receiving it directly or as a derived shared secret. This may take place at a M2M device and at a server (e.g. NAF), using GBA. This first key is used to protect (encrypt and or sign) and send a further or second key to the M2M device (step 720). The second key is in turn is used to secure, protect, encrypt and/or sign data transmitted to the M2M device (step 730). The M2M device can then verify the data using the second key.

In one example, residential gas meters may require firmware updates (e.g. a bug is discovered which means that they will incorrectly report gas consumed. Hackers may be trying to exploit this and a patch is required). The cellular operator provides some broadcast capabilities on their network—for example via MBMS. One of the broadcast channels is "free to air" (i.e. it is unencrypted) but consists of a stream of firmware updates for many types of M2M devices (gas meters, electricity meters, engine management systems etc.) Each update may be signed by a separate private key, and the key-pairs may be refreshed regularly (to ensure that only the most recent updates are signed by the latest keys).

When each gas meter next contacts the device management server, it is provided with an authenticated public key. The public key may be integrity protected using the shared secret (Ks_NAF) that has been established between the gas meter and M2M device management server using GBA. The gas meter then monitors the MBMS broadcast channel to detect when an update is being broadcast and which has been signed with the corresponding private key. It downloads the update, verifies it using the public key, and if verified installs the update.

In another example implementation, a third party organisation (commercial, government, or non-commercial, for example) may wish to introduce a new service or services and these services may be categorised by device type and device category (i.e. road traffic alerts may be an information-alert type having a device category as transportation. A tsunami warning system may be of type emergency public safety message, and device category "all". This taxonomical device categorisation system may be further refined to ensure that service advertisements were routed to appropriate devices.)

The third party organisation may inform a service provider (for example, a telecommunications service provider) of the service. The service provider may validate the service and may use the mechanism described above in relation to secure message broadcast to distribute a description of the service to devices.

This service could be used recursively to advise of other service advertisers. In other words, the service provide could advertise the existence of a Regulatory body (A government agency) that could be authorised to advertise government services.

These services may be of three types opt in, opt out and mandatory. In other words, a service for national security purposes advertised by a government agency may be mandatory, a service for road traffic alerts provided by a commercial company may be opt in and a service advertised by a government agency for a public safety purpose may be opt out.

In a further example, a third party organisation (commercial, government, or non-commercial) may wish to introduce one or more new services. These services may be categorised by device type and device category (i.e. road traffic alerts would be of type information-alert, and device category transportation, tsunami warning system would be of type emergency public safety message, and device category all. This taxonomical device categorisation system could be further refined to ensure that service advertisements were routed to appropriate devices.)

The third party organisation may inform a telecommunications network operator of the service. The network operator may validate the service and may use the method of communicating with M2M devices described above to distribute a description of the service to devices.

This service could be used recursively to advise of other service advertisers. In other words, a network operator could advertise the existence of a regulatory body (i.e. a government agency) that could be authorised to advertise government services, for example.

Examples services may be of three types in general: opt in/opt out/mandatory. For example, a service for national security purpose advertised by a government agency would be mandatory, a service for road traffic alerts provided by a commercial company would be opt in and a service advertised by a government agency for a public safety purpose could be opt out.

One example use of GBA keys is to protect SMS (encrypt/integrity protect SMS using secure packet interface e.g. like ETSI TS 102.225 which is used for SIM OTA). This SMS channel is likely to be more efficient than DTLS.

Encrypted SMS functionality is currently missing from OMA LWM2M. In other implementations, a secured SMS protocol may be used with a Device management protocol. For example:

a) Using a secure SMS protocol, originally designed for SIM OTA (102 225), but now adapted for LWM2M communications, and b) Using the LWM2M protocol to define (and manage) the necessary parameters for a secure SMS protocol, e.g. the relevant KIc, KID, SPI, TAR, and keys. Any one or more of these may form the key material described previously.

Use of GBA then becomes a further extension to this idea, as it is used to securely derive the keys.

Figure 10:
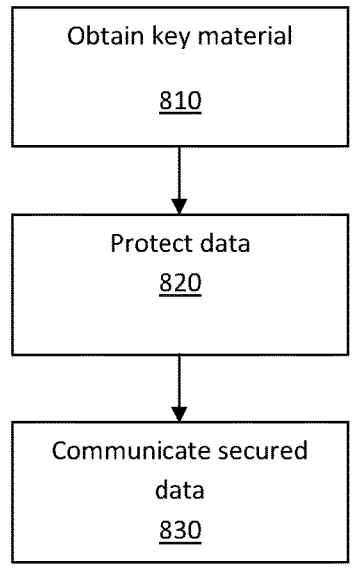
FIG. 10 shows a flowchart of a method for communication between a M2M device and a device management server.

FIG. 10 shows a flowchart of a method 800 for communicating between a M2M device and a DM server over SMS. At step 810 key material is obtained by the M2M device. In this particular embodiment, the M2M device comprises a smartcard. There are several mechanisms for the M2M device to obtain this key material. Examples of these mechanisms are described above as solutions for delivering keys and parameters in a secure way. The key material or corresponding key material (i.e. used to derive a shared secret) is stored or derived on the DM server. Data to be communicated is protected using the key material step 820 and the data is communicated between the DM server and the M2M device (e.g. one or two way communications in either or both directions) at step 830. This communication uses SMS as a data bearer.

The key material may be a symmetric key. In this simple example, both the M2M device and the DM server may encrypt and decrypt the protected data using the symmetric key. In other examples, the key material may be used to derive an asymmetric key. In yet another example the key material is or is used to derive a session key (e.g. by Diffie-Hellman key exchange).

Protection of the data may be by encryption and/or digital signature, for example.

As described previously, the data may include packet data. The data may take the form of CoAP. Therefore, efficient, reliable and secure communication may take place over SMS to communicate with M2M devices.

Figure 12:
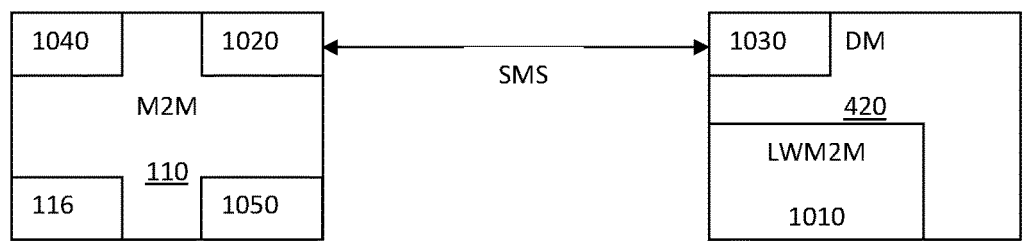
FIG. 12 shows a schematic diagram of a M2M device and a device management server communicating over SMS.

FIG. 12 shows schematically the M2M device 110 communicating with the DM server 420 according to the method described with regards to FIG. 10. In particular, the M2M device 110 has a SMS interface 1020 and a secure execution environment (SEE) 1040. In this example, the SEE is a SIM. The M2M device 110 also has a LWM2M client 1050.

The SEE 1040 is used to derive and/or store (or have written into it) the key material. The SEE 1040 may also terminate SMS messages bearing protected data. In alternative embodiments, the device may terminate the SMS message (or other form of secure communication) and so the SEE 1040 may not be required.

The DM server 420 has a LWM2M server 1010 has its own SMS interface 1030.

In one particular example, an industrial thermostat system (e.g. in a warehouse) may have the temperature set remotely via a device management server. Since the temperature data is very short (just a number in degrees C.), then it (or any other data) may be transmitted in a single SMS, for example using the OMA LWM2M protocol with a SMS bearer.

Therefore, there is a need to protect the SMS to prevent malicious tampering with the thermostat (or other equipment that may rely on sensor or parameter data) and possible damage to goods stored in the warehouse, unnecessary energy bills etc. The SMS may be encrypted and integrity protected using the secure packet protocol described in ETSI TS 102 225. First, GBA is used to establish a KS_NAF between the thermostat and the LWM2M server. For convenience, an initial SMS may be used to deliver a GPI (GBA push info) message from the LWM2M server to the thermostat.

This GPI contains an authentication challenge to pass to a SIM card (UICC), which might be in the thermostat, or perhaps elsewhere in the warehouse network (it might be in a communications hub). The challenge is processed by the USIM application on the SIM card, and a CK and IK are returned.

These are then used to derive the Ks, and then the Ks_NAF which is passed to the thermostat. The thermostat (or other equipment) then extracts keys for the Kc and Kid and stores them for use by the LWM2M client on the thermostat. A solution could be as follows: The Ks_NAF is 256 bits (or total number of bits); the first 128 bits (or set of bits) are used as an AES encryption key (for the Kc) and the last 128 bits (or next or final set of bits) are used as an integrity key (for the Kid). Once this has been set up, an encrypted and integrity protected SMS with the desired temperature can be sent whenever needed from the LWM2M server to the LWM2M client on the thermostat. The client then decrypts and verifies the desired temperature, and the thermostat sets that temperature (or device changes a particular setting or parameter).

Automated Test-Suite.

In this example implementation, an automated test-suite may be used by added value service providers that could be used to supply additional maintenance services (in this case diagnostics and performance analysis) for the purpose of ensuring optimal device behaviour. Typically, this would be a service offered by the original device vendor as an added-value service. However, it is feasible that specialist service providers might supply these services (e.g. car maintenance/tuning service). The benefit to the equipment vendor is that it creates a revenue and on-sell opportunities. Another use case would be where there was a complex device ecosystem (e.g. a home area network (HAN) with many peripheral devices of different types). A HAN maintenance service provider would have (or would create) signature data for a correct and incorrect operation of supported devices and would provide diagnostic services for those devices.

Other messaging channels (and this applies to all the described examples) could be conventional DSL and WiFi where there was a low level of security over the physical infrastructure and easy to intercept and interfere with communications.

Use GBA to send a secured message which starts a self-test/diagnostic test of device. This covers LWM2M functionality, or general functionality. Results of the self-test can also be reported back using a GBA-secured message. This could build on SMS security, as described in Idea 16, or use a different messaging channel.

For performance, and power-management reasons, we don't want just anyone to be able to trigger a self-test, which is why this should be a secured message. Also, for privacy and security reasons, we don't want the results of the self-test to be revealed to anyone who asks. However, it is unlikely that anyone would ever set up special strong security just to do this. So it is a good use-case for GBA as opposed to other security architectures.

End-of-Life Sale and Decommissioning of Device.

This example implementation illustrates the ability to create a trust relationship between devices and service providers, creates opportunities to offer security services to all devices in a symmetric fashion. For example, a toaster can be used as an appliance to facilitate a user to vote in a Government election, and an e-purse can acquire road traffic information. Security services can be offered on an any-to-any basis in a device agnostic fashion. In the end of life cases, the authorisation for the device to participate in an auction to sell itself or/and to procure a replacement would be supplied by the owner of the appliance (by some means), and the responsibility for participating in an auction sale/bid would be delegated to the device in question.

Once the trust relationship is in place, it creates an opportunity to add value. In the end of life case, this could include providing service/life histories to potential buyers or scheduling collection of the device for disposal and recycling.

The device may use a secure association established using GBA to list itself on eBay for example, and order a replacement.

These sorts of automated sale and order applications require strong security. Therefore, this is a good use of the particular described GBA implementation.

Security Keyring

This example implementation describes a mechanism for transferring security protected material in an asymmetric fashion, from a secured device using GBA, to a (potentially) unsecured device. Many examples can be given for this use case using the keyring analogy. These transfers may be automated or under user control or a combination of both.

A further extension of this would be symmetric use where two unrelated GBA aware appliances needed to exchange information (as described in WO2012/035340).

The devices recognise the presence and the identity of each other (i.e. they have visibility of each other such as a car passing through a toll booth. The toll booth could use an induction loop to detect the presence of a car, and use Bluetooth/RFID (or other sensor) to supply other information in plain text, for example) and would acquire signature information from the other device. Each device communicates by secure means to their Device Management platform the existence of the other device+security credentials+the security signatures (received and given). The Device Management platforms (which would have a pre-existing trust relationship between each other, such as by means of trusted CA certificates) then validate the supplied signatures for each device and negotiate security keys to support inter communication between the devices. (This may be a simple symmetric key). The derived keys are sent to the devices and the devices are then able to communicate with each other securely and initiate a monetary transfer (for example).

Figure 11:
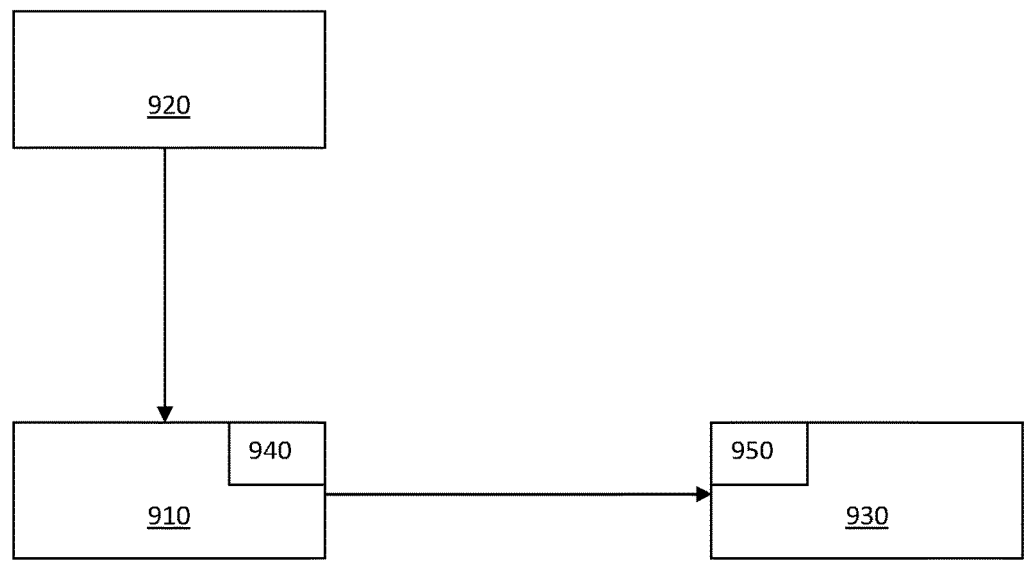
FIG. 11 shows a schematic diagram of an apparatus for transferring keys to a device.

FIG. 11 shows a schematic diagram of a system including a keyring 910 (or apparatus for providing a key to a M2M device 930) and a DM server 920 for providing the key.

The keyring 910 has a cellular interface to communicate with the DM server 920 and an interface (either the same or different interface) to communication with the M2M device 930.

The keyring 910 has logic (e.g. stored within a processor) configured to derive a key using GBA over the cellular interface and transmit the key to the M2M device.

Examples implementations include:

Cars+toll booths+parking facilities+car wash+any car service.

Personal monitoring appliances+gym machines+health services+emergency responders.

HANs+fridges+cookers+TVs+ . . . . Any other domestic appliance to:
  1) Communicate energy use information.
  2) Security monitoring (your toaster becomes a burglar alarm, for example).
  3) Environment monitoring (your toaster becomes a fire alarm, for example).

In one example use of the "keyring" 910 is to authorise a third party (e.g. an approved dealer/garage) to perform an action on the SIM that would otherwise only be allowed using a secured OTA (over the air) mechanism. This may be used where the OTA mechanism was not possible or unavailable for some reason.

A keyring 910 with cellular connectivity and correct implementation of the GBA protocol stack can be issued with keys using normal GBA protocols. The keyring 910 supports a mechanism to physically transfer such keys to appliances that do not have cellular connectivity. This can be facilitated using any (secure) physical communications link (e.g. Ethernet, NFC, RS232 etc). This can be achieved in at least two ways:

1) Store and forward—keys are transferred to the keyring for subsequent transfer to the target devices.

2) Man in middle—where the keyring functions as a man in middle allowing the target device to utilise the keyring for the cellular leg.

The actual mechanism uses different security protocols. Enhancements to the GBA protocol to support this feature may be used. For example, to indicate what is the target device or appliance; use inputs like random nonces supplied by the keyring 910 and target device, hashes of temporary public keys, address of the target device (e.g. MAC address etc.) as part of the input to the key derivation (to help protect against interception over a local wireless protocol); to detect at the NAF if the key is being used by a different sort of target/appliance (or wrong address), and to quickly expire or invalidate keys which get lost etc.

Therefore, GBA is used to establish a P2P security association between unrelated devices and using GBA provides a good solution.

In one example implementation, the keyring will support a visual (or other feedback mechanism such as sound or vibrate) to indicate when security keys have been successfully transferred to the target device. This feedback mechanism can be implemented on the keyring or the target device or preferably both.

This is illustrated further in FIG. 11. The keyring 910 may also have an indicator 940 for indicating the status of the transmission of the key to the M2M device. The M2M device may also have a similar indicator 950.

For example, while transferring security keys the keyring glows blue for a few seconds to indicate success. While transferring keys from the keyring to the target device the keyring glows blue and target device glows blue for a few seconds. Other colours or indicator types may be used.

This improves usability and acts as a mechanism to communicate a trust relationship establishment in a user friendly fashion.

Automotive example:

In this further embodiment, the following may be considered:

A car plus a:
  1) Toll booth;
  2) Car Park;
  3) Car wash; or
  4) Drive thru.

The car may be equipped with, incorporate or otherwise associated with a GBA enabled M2M capability and local near field device recognition (e.g. the interface between the apparatus and the M2M device may be RFID, Zigbee, WiFi, NFC, BLE, etc.) and a toll booth operated by an unrelated commercial entity which is similarly equipped.

The car may approach the Toll booth (or other infrastructure) and:
  1) The car would broadcast that it was a car and needed to access the tolled area (or other service); or
  2) The driver would indicate to the car that it needed to access the tolled area and then step 1) may proceed; or
  3) The toll booth would sense the presence of the car and would broadcast its presence and request the car to confirm it required access to the toll area then step 2) or step 1).

The car and the toll booth would exchange (untrusted) identity information. The toll booth may also capture other metrics (car number plate, car size/weight/colour etc.)

The car would communicate the toll booth's untrusted identity information to a modified NAF Server: this communication is secured (or has already been secured) using the GBA protocol. Similarly, the toll booth would do the same and communicate the car's untrusted identity information (and any other metrics) using its modified NAF Server.

The two unrelated NAF servers would then communicate with each other using known security protocols and certificate authority authenticated certificates and confirm that the supplied untrusted identity information could be trusted. Keys would be created and communicated to the car and the toll booth by their respective NAF servers, and these keys would then allow them to complete commercial transactions.

Therefore, untrusted and unrelated devices (e.g. car and toll both) can create trust relationships. Typically, this would be for the purpose of financial transaction but it could also be used where other data items may need to be integrity/confidentiality protected (e.g. an exercise machine in a health club).

In another example, a biometric scanner may be used to confirm the identity of a person. The asset being secured here is the information "this person is real and has been biometrically authenticated". The other (partner) device might be a keyring, a domestic appliance, a car or other device.

The car/vehicle manufacturer does not require prior association with the biometric scanner/manufacturer. The connection between the two NAFs allows the car to trust the results from the (unknown) scanner, and so open accordingly.

In another example implementation, the user may want to purchase domestic appliances from multiple vendors. The interoperation of those devices may be desirable. An example may be white goods that would communicate with a power monitoring device.

It is to be understood that the above description is given by way of example and only for the benefit of understanding the solution, and it must include also any combination of the above features, as well as any alterations, modifications or otherwise addition which could be done by a skilled person by use of his/her skills and/or general knowledge in the relevant and/or neighbouring art.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for ensuring integrity protection of short message service (SMS) communications transmitted between a machine to machine (M2M) device and a device management (DM) server, the method comprising:
    obtaining, at an intermediary keyring computing device positioned between the M2M device and the DM server, key material that is configured to protect data communicated between the M2M device and the DM server;
    causing the intermediary keyring computing device to transfer the key material to the M2M device, wherein while the intermediary keyring computing device is transferring the key material to the M2M device, a first indicator on the intermediary keyring computing device and a second indicator on the M2M device both provide visual indications indicating a status of the transfer of the key material;
    causing the M2M device to use the key material received from the intermediary keyring computing device to protect the data, which is to be transmitted to the DM server via an SMS message;
    determining a mobile station international subscriber directory number (MSISDN) of the SMS message, which is received by the DM server;
    searching for the MSISDN within a data store;
    ignoring the SMS message when the MSISDN is not found within the data store; and
    causing the DM server, when the MSISDN is found within the data store, to decrypt the protected data using the key material.

2. The method of claim 1, wherein the intermediary keyring computing device transfers the key material to the M2M device over SMS.

3. The method of claim 1, wherein the protected data includes a constrained application protocol (CoAP) message.

4. The method of claim 1, wherein the M2M device obtains the key material from the intermediary keyring, and wherein the M2M device:
    stores the key material in a memory within the M2M device; or
    stores the key material in a smartcard within the M2M device.

5. The method of claim 1, wherein the M2M device obtains the key material from the intermediary keyring and stores the key material in a smartcard within the M2M device.

6. The method of claim 1, wherein the M2M device obtains the key material from the intermediary keyring and stores the key material in a memory of the M2M device.

7. The method of claim 1, wherein decrypting the protected data is executed within a smartcard.

8. The method of claim 1, wherein the protected data are packet data.

9. A machine to machine (M2M) device comprising:
    a short message service (SMS) interface; and
    one or more computer-readable hardware storage devices having stored thereon logic that is executable by the M2M device to cause the M2M device to:
        obtain, from an intermediary keyring computing device positioned between the M2M device and a device management (DM) server, key material that is configured to protect data communicated between the M2M device and the DM server;
            wherein, while the intermediary keyring computing device is transferring the key material to the M2M device, a first indicator on the intermediary keyring computing device and a second indicator on the M2M device both provide visual indications indicating a status of the transfer of the key material;
        use the key material received from the intermediary keyring computing device to protect the data, which is to be transmitted to the DM server via an SMS message;
        determine a mobile station international subscriber directory number (MSISDN) of the SMS message, which is to be sent to the DM server;
        search for the MSISDN within a data store;

determine that the DM server is to ignore the SMS message when the MSISDN is not found within the data store; and determine, when the MSISDN is found within the data store, that the DM server is to decrypt the protected data using the key material.

10. The M2M device of claim 9, wherein the data store is within a smartcard.

11. The M2M device of claim 10, wherein the logic is further configured to terminate the SMS message within the smartcard.

12. The M2M device of claim 10, wherein the smartcard is further configured to confirm an integrity of the protected data.

13. The M2M device of claim 12, wherein the logic is further configured to reject or discard any SMS messages having protected data that fails confirmation of integrity.

14. The M2M device according to claim 11, wherein the smartcard is selected from the group consisting of: a subscriber identity module (SIM), an embedded SIM, and a universal integrated circuit card (UICC).

15. One or more computer-readable hardware storage device(s) having stored thereon logic that is executable by a machine to machine (M2M) device to cause the M2M device to ensure integrity protection of short message service (SMS) communications transmitted between the M2M device and a device management (DM) server by causing the M2M device to:

obtain, from an intermediary keyring computing device positioned between the M2M device and the DM server, key material that is configured to protect data communicated between the M2M device and the DM server;

wherein, while the intermediary keyring computing device is transferring the key material to the M2M device, a first indicator on the intermediary keyring computing device and a second indicator on the M2M device both provide visual indications indicating a status of the transfer of the key material;

use the key material received from the intermediary keyring computing device to protect the data, which is to be transmitted to the DM server via an SMS message;

determine a mobile station international subscriber directory number (MSISDN) of the SMS message, which is to be sent to the DM server;

search for the MSISDN within a data store;

determine that the DM server is to ignore the SMS message when the MSISDN is not found within the data store; and determine, when the MSISDN is found within the data store, that the DM server is to decrypt the protected data using the key material.

16. The method of claim 1, wherein the key material is a symmetric key.

17. The method of claim 1, wherein the key material is usable to derive an asymmetric key.

* * * * *